United States Patent
Koda et al.

(10) Patent No.: US 10,550,248 B2
(45) Date of Patent: Feb. 4, 2020

(54) RUBBER COMPOSITION AND TIRE

(71) Applicants: KURARAY CO., LTD., Kurashiki-shi (JP); AMYRIS, INC., Emeryville, CA (US)

(72) Inventors: Daisuke Koda, Kamisu (JP); Kei Hirata, Kamisu (JP)

(73) Assignees: KURARAY CO., LTD., Kurashiki-shi (JP); AMYRIS, INC., Emeryville, CA (US)

(*) Notice: Subject to any disclaimer, the term of this patent is extended or adjusted under 35 U.S.C. 154(b) by 0 days.

(21) Appl. No.: 14/913,638

(22) PCT Filed: Aug. 11, 2014

(86) PCT No.: PCT/JP2014/071191
§ 371 (c)(1),
(2) Date: Feb. 22, 2016

(87) PCT Pub. No.: WO2015/025762
PCT Pub. Date: Feb. 26, 2015

(65) Prior Publication Data
US 2016/0200902 A1   Jul. 14, 2016

(30) Foreign Application Priority Data
Aug. 23, 2013 (JP) ................. 2013-173740

(51) Int. Cl.
*C08L 9/06* (2006.01)

(52) U.S. Cl.
CPC ...................... *C08L 9/06* (2013.01)

(58) Field of Classification Search
CPC .. C08K 9/06; C08K 3/36; C08C 19/02; C08L 9/06; C08L 7/00; B60C 1/00; Y02T 10/862
USPC ................................ 523/165, 156
See application file for complete search history.

(56) References Cited

U.S. PATENT DOCUMENTS

| | | | | |
|---|---|---|---|---|
| 5,257,491 A | * | 11/1993 | Rouyer | B29B 13/022 206/447 |
| 5,643,648 A | * | 7/1997 | Kobe | B29C 73/10 152/367 |
| 2008/0145668 A1 | * | 6/2008 | Jung | C09D 167/02 428/413 |
| 2012/0165474 A1 | * | 6/2012 | McPhee | C08C 19/02 525/314 |
| 2013/0123379 A1 | | 5/2013 | McPhee | |
| 2014/0155536 A1 | | 6/2014 | Kuwahara et al. | |

FOREIGN PATENT DOCUMENTS

| | | |
|---|---|---|
| JP | 2009-120819 A | 6/2009 |
| JP | 2012-502135 A | 1/2012 |
| JP | 2012-502136 A | 1/2012 |
| JP | 2013/125496 A1 | 8/2013 |
| JP | 2013-532767 A | 8/2013 |
| WO | 2010/027463 A1 | 3/2010 |
| WO | 2010/027464 A1 | 3/2010 |
| WO | WO 2012/018682 * | 2/2012 |
| WO | 2013/047347 A1 | 4/2013 |
| WO | 2013/047348 A1 | 4/2013 |

OTHER PUBLICATIONS

International Search Report dated Nov. 11, 2014, in PCT/JP2014/071191 Filed Aug. 11, 2014.

* cited by examiner

*Primary Examiner* — Doris L Lee
(74) *Attorney, Agent, or Firm* — Oblon, McClelland, Maier & Neustadt, L.L.P.

(57) ABSTRACT

The present invention provides a rubber composition capable of producing a rubber molded article that is excellent in rolling resistance performance, steering stability, mechanical strength and abrasion resistance, and a tire obtained by using the rubber composition in at least a part thereof. The present invention relates to a rubber composition including (A) a rubber component including at least one rubber selected from the group consisting of a synthetic rubber and a natural rubber, (B) silica and (C) a modified polymer of farnesene obtained by introducing a functional group into a polymer of farnesene, in which a content of the silica (B) in the rubber composition is from 20 to 150 parts by mass on the basis of 100 parts by mass of the rubber component (A), and a content of the modified farnesene polymer (C) in the rubber composition is from 2 to 10 parts by mass on the basis of 100 parts by mass of the silica (B).

15 Claims, No Drawings

RUBBER COMPOSITION AND TIRE

TECHNICAL FIELD

The present invention relates to a rubber composition containing a rubber component, silica and a polymer of farnesene, and a tire at least partially using the rubber composition.

BACKGROUND ART

In recent years, in order to manufacture tires capable of satisfying both of low-fuel consumption performance and fracture characteristics, intense study has been made on rubber compositions containing silica.

However, since the silica has poor dispersibility in the rubber compositions, the vulcanized rubber compositions tend to fail to exhibit sufficient rolling resistance performance, mechanical strength and abrasion resistance.

In addition, in order to attain good reinforcing properties by bonding the silica and rubber component with each other, a silane coupling agent such as sulfide silane is generally used in the rubber compositions. Even in such a case, owing to insufficient bond between the silica and rubber component, the resulting rubber compositions tend to have a low stiffness, i.e., are unsatisfactory in steering stability.

To solve the above conventional problems, in PTL1, as a rubber composition that can be improved in the aforementioned properties in a well-balanced manner, there has been proposed a rubber composition that includes a rubber component, silica and a silane coupling agent having a specific molecular structure at a predetermined compounding ratio.

Meanwhile, PTL2 and PTL3 describe a polymer of β-farnesene, but fail to have a sufficient study on practical applications thereof.

CITATION LIST

Patent Literature

PTL1: JP 2009-120819A
PTL2: WO 2010/027463A
PTL3: WO 2010/027464A

SUMMARY OF INVENTION

Technical Problem

The rubber composition described in PTL1 can be improved in rolling resistance performance, steering stability, mechanical strength and abrasion resistance to a certain extent, but it has been demanded to further improve the respective properties of the rubber composition.

The present invention has been made in view of the above conventional problems. The present invention provides a rubber composition capable of producing a rubber molded article that is excellent in rolling resistance performance, steering stability, mechanical strength and abrasion resistance, and a tire obtained by using the rubber composition in at least a part thereof.

Solution to Problem

As a result of extensive and intensive researches, the present inventors have found that a molded article of a rubber composition using a conjugated diene-based polymer having a specific structure is excellent in rolling resistance performance, steering stability, mechanical strength and abrasion resistance. The present invention has been accomplished on the basis of the above finding.

That is, the present invention relates to the following aspects [1] and [2].

[1] A rubber composition including (A) a rubber component including at least one rubber selected from the group consisting of a synthetic rubber and a natural rubber, (B) silica and (C) a modified polymer of farnesene obtained by introducing a functional group into a polymer of farnesene (hereinafter also referred to merely as a "modified polymer (C)"), in which a content of the silica (B) in the rubber composition is from 20 to 150 parts by mass on the basis of 100 parts by mass of the rubber component (A), and a content of the modified polymer (C) in the rubber composition is from 2 to 10 parts by mass on the basis of 100 parts by mass of the silica (B).

[2] A tire including the above rubber composition in at least a part thereof.

Advantageous Effects of Invention

According to the present invention, there are provided a rubber composition capable of producing a rubber molded article that is excellent in rolling resistance performance, steering stability, mechanical strength and abrasion resistance, and a tire obtained by using the rubber composition in at least a part thereof.

DESCRIPTION OF EMBODIMENTS

[Rubber Composition]

The rubber composition of the present invention includes (A) a rubber component including at least one rubber selected from the group consisting of a synthetic rubber and a natural rubber, (B) silica and (C) a modified polymer of farnesene obtained by introducing a functional group into a polymer of farnesene, in which a content of the silica (B) in the rubber composition is from 20 to 150 parts by mass on the basis of 100 parts by mass of the rubber component (A), and a content of the modified polymer (C) in the rubber composition is from 2 to 10 parts by mass on the basis of 100 parts by mass of the silica (B).

<Rubber Component (A)>

As the rubber component (A), at least one rubber selected from the group consisting of a synthetic rubber and a natural rubber is used. Examples of the rubber component (A) used herein include a styrene-butadiene rubber (hereinafter also referred to merely as "SBR"), a butadiene rubber, an isoprene rubber, a butyl rubber, a halogenated butyl rubber, an ethylene propylene diene rubber, a butadiene acrylonitrile copolymer rubber, a chloroprene rubber and a natural rubber. Among these rubbers, preferred are SBR, a butadiene rubber, an isoprene rubber and a natural rubber, and more preferred are SBR and a natural rubber. These rubbers may be used alone or in combination of any two or more thereof.

[Synthetic Rubber]

When using a synthetic rubber as the rubber component (A), as the synthetic rubber, preferred are SBR, a butadiene rubber, an isoprene rubber, a butyl rubber, a halogenated butyl rubber, an ethylene propylene diene rubber, a butadiene acrylonitrile copolymer rubber, a chloroprene rubber and the like. Among these rubbers, more preferred are SBR, an isoprene rubber and a butadiene rubber, and even more preferred is SBR.

(SBR (A-1))

As SBR, there may be used those SBR's generally used in the applications of tires. More specifically, the SBR preferably has a styrene content of from 0.1 to 70% by mass, more preferably from 5 to 50% by mass and even more preferably from 15 to 35% by mass. Also, the SBR preferably has a vinyl content of from 0.1 to 60% by mass and more preferably from 0.1 to 55% by mass.

The weight-average molecular weight (Mw) of the SBR is preferably from 100,000 to 2,500,000, more preferably from 150,000 to 2,000,000 and even more preferably from 200,000 to 1,500,000. When the weight-average molecular weight of the SBR falls within the aforementioned range, the resulting rubber composition can be enhanced in both processability and mechanical strength.

Meanwhile, Mw as used in the present specification means the value measured by the method described in Examples below.

The glass transition temperature (Tg) of the SBR as used in the present invention which may be determined by differential thermal analysis is preferably in the range of from −95° C. to 0° C. and more preferably from −95° C. to −5° C. When adjusting Tg of the SBR to the aforementioned range, it is possible to suppress excessive increase in viscosity of the SBR and enhance handling properties thereof.

<<Method for Producing SBR>>

The SBR usable in the present invention may be produced by copolymerizing styrene and butadiene. The production method of the SBR is not particularly limited, and the SBR may be produced by any of an emulsion polymerization method, a solution polymerization method, a vapor phase polymerization method and a bulk polymerization method. Among these polymerization methods, particularly preferred are an emulsion polymerization method and a solution polymerization method.

(i) Emulsion-Polymerized Styrene-Butadiene Rubber (E-SBR)

E-SBR may be produced by an ordinary emulsion polymerization method. For example, a predetermined amount of a styrene monomer and a predetermined amount of a butadiene monomer are emulsified and dispersed in the presence of an emulsifying agent, and then the resulting emulsion is subjected to emulsion polymerization using a radical polymerization initiator.

As the emulsifying agent, there may be used a long-chain fatty acid salt having not less than 10 carbon atoms or a rosinic acid salt. Specific examples of the emulsifying agent include potassium salts and sodium salts of fatty acids such as capric acid, lauric acid, myristic acid, palmitic acid, oleic acid and stearic acid.

As a dispersant for the above emulsion polymerization, there may be usually used water. The dispersant may also contain a waster-soluble organic solvent such as methanol and ethanol unless the use of such an organic solvent has any adverse influence on stability of the polymerization.

Examples of the radical polymerization initiator include persulfates such as ammonium persulfate and potassium persulfate, organic peroxides and hydrogen peroxide.

In order to suitably control a molecular weight of the obtained E-SBR, there may be used a chain transfer agent. Examples of the chain transfer agent include mercaptans such as t-dodecyl mercaptan and n-dodecyl mercaptan; and carbon tetrachloride, thioglycolic acid, diterpene, terpinolene, γ-terpinene and an α-methylstyrene The temperature used upon the emulsion polymerization may be appropriately determined according to the kind of radical polymerization initiator used therein, and is usually preferably from 0 to 100° C. and more preferably from 0 to 60° C. The polymerization method may be either a continuous polymerization method or a batch polymerization method. The polymerization reaction may be stopped by adding a terminating reagent to the reaction system.

Examples of the terminating reagent include amine compounds such as isopropyl hydroxyl amine, diethyl hydroxyl amine and hydroxyl amine; quinone-based compounds such as hydroquinone and benzoquinone; and sodium nitrite.

After terminating the polymerization reaction, an antioxidant may be added to the reaction system, if required. Furthermore, after terminating the polymerization reaction, unreacted monomers may be removed from the resulting latex, if required. Thereafter, the obtained polymer is coagulated by adding a salt such as sodium chloride, calcium chloride and potassium chloride as a coagulant thereto, if required, while adjusting a pH value of the coagulation system to a desired value by adding an acid such as nitric acid and sulfuric acid thereto, and then the dispersing solvent is separated from the resulting reaction solution to recover the polymer as a crumb. The thus recovered crumb is washed with water and dehydrated, and then dried using a band dryer or the like to obtain E-SBR. Meanwhile, upon coagulating the polymer, the latex may be previously mixed, if required, with an extender oil in the form of an emulsified dispersion to recover the polymer in the form of an oil-extended rubber.

Examples of commercially available products of E-SBR include an oil extended styrene-butadiene rubber "JSR1723" available from JSR Corporation.

(ii) Solution-Polymerized Styrene-Butadiene Rubber (S-SBR)

S-SBR may be produced by an ordinary solution polymerization method. For example, styrene and butadiene are polymerized in a solvent using an anion-polymerizable active metal, if required, in the presence of a polar compound.

Examples of the anion-polymerizable active metal include alkali metals such as lithium, sodium and potassium; alkali earth metals such as beryllium, magnesium, calcium, strontium and barium; and lanthanoid-based rare earth metals such as lanthanum and neodymium. Among these active metals, preferred are alkali metals and alkali earth metals, and more preferred are alkali metals. The alkali metals are even more preferably used in the form of an organic alkali metal compound.

Examples of the solvent include aliphatic hydrocarbons such as n-butane, n-pentane, isopentane, n-hexane, n-heptane and isooctane; alicyclic hydrocarbons such as cyclopentane, cyclohexane and methyl cyclopentane; and aromatic hydrocarbons such as benzene and toluene. These solvents are preferably used in such an amount that a concentration of the monomer dissolved therein lies within the range of from 1 to 50% by mass.

Specific examples of the organic alkali metal compound include organic monolithium compounds such as n-butyl lithium, sec-butyl lithium, t-butyl lithium, hexyl lithium, phenyl lithium and stilbene lithium; polyfunctional organic lithium compounds such as dilithiomethane, 1,4-dilithiobutane, 1,4 dilithio 2 ethyl cyclohexane and 1,3,5-trilithiobenzene; and sodium naphthalene and potassium naphthalene. Among these organic alkali metal compounds, preferred are organic lithium compounds, and more preferred are organic monolithium compounds. The amount of the organic alkali metal compound used may be appropriately determined according to a molecular weight of S-SBR as required.

The organic alkali metal compound may also be used in the form of an organic alkali metal amide by allowing a secondary amine such as dibutyl amine, dihexyl amine and dibenzyl amine to react therewith.

The polar compound used in the solution polymerization is not particularly limited as long as the compound causes no deactivation of the reaction in the anion polymerization and can be ordinarily used for controlling a microstructure of butadiene moieties and distribution of styrene in a copolymer chain thereof. Examples of the polar compound include ether compounds such as dibutyl ether, tetrahydrofuran and ethylene glycol diethyl ether; tertiary amines such as tetramethyl ethylenediamine and trimethylamine; and alkali metal alkoxides and phosphine compounds.

The temperature used in the above polymerization reaction is usually in the range of from −80 to 150° C., preferably from 0 to 100° C. and more preferably from 30 to 90° C. The polymerization method may be either a batch method or a continuous method. Also, in order to improve a random copolymerizability between styrene and butadiene, the styrene and butadiene are preferably supplied to a reaction solution in a continuous or intermittent manner such that a compositional ratio between the styrene and butadiene in the polymerization system falls within a specific range.

The polymerization reaction may be stopped by adding an alcohol such as methanol and isopropanol as a terminating reagent to the reaction system. In addition, before adding the terminating reagent, there may be added a coupling agent such as tin tetrachloride, tetrachlorosilane, tetramethoxysilane, tetraglycidyl-1,3-bisaminomethyl cyclohexane and 2,4-tolylene diisocyanate which are capable of reacting with an active end of the polymer chain, and a chain end-modifying reagent such as 4,4'-bis(diethylamino)benzophenone and N-vinyl pyrrolidone. The polymerization reaction solution obtained after terminating the polymerization reaction may be directly subjected to drying or steam stripping to remove the solvent therefrom, thereby recovering the S-SBR as a target product. Meanwhile, before removing the solvent, the polymerization reaction solution may be previously mixed with an extender oil to recover the S-SBR in the form of an oil-extended rubber.

(iii) Modified Styrene-Butadiene Rubber (Modified SBR)

In the present invention, there may also be used a modified SBR produced by introducing a functional group into SBR. Examples of the functional group to be introduced into SBR include an amino group, an alkoxysilyl group, a hydroxy group, an epoxy group and a carboxy group.

As the method of producing the modified SBR, there may be used, for example, the method in which before adding the terminating reagent, a coupling agent such as tin tetrachloride, tetrachlorosilane, dimethyl dichlorosilane, dimethyl diethoxysilane, tetramethoxysilane, tetraethoxysilane, 3-aminopropyl triethoxysilane, tetraglycidyl-1,3-bisaminomethyl cyclohexane and 2,4-tolylene diisocyanate which are capable of reacting with an active end of the polymer chain, a chain end-modifying reagent such as 4,4'-bis(diethylamino)benzophenone and N-vinyl pyrrolidone, or the other modifying reagent as described in JP 2011-132298A is added to the polymerization reaction system.

In the modified SBR, the site of the polymer into which the functional group is introduced may be either a chain end or a side chain of the polymer.

(Isoprene Rubber (A-II))

The isoprene rubber used in the present invention may be a commercially available isoprene rubber which may be obtained by the polymerization using a Ziegler-based catalyst such as titanium tetrahalide-trialkyl aluminum-based catalysts, diethyl aluminum chloride-cobalt-based catalysts, trialkyl aluminum-boron trifluoride-nickel-based catalysts and diethyl aluminum chloride-nickel-based catalysts; a lanthanoid-based rare earth metal catalyst such as triethyl aluminum-organic acid neodymium salt-Lewis acid-based catalysts; or the organic alkali metal compound as used similarly for production of the S-SBR. Among the isoprene rubbers, preferred are isoprene rubbers obtained by the polymerization using the Ziegler-based catalyst because of a high cis isomer content thereof. In addition, there may also be used those isoprene rubbers having an ultrahigh cis isomer content which are produced using the lanthanoid-based rare earth metal catalyst.

The isoprene rubber preferably has a vinyl content of not more than 50% by mass, more preferably not more than 40% by mass, and even more preferably not more than 30% by mass. When the vinyl content of the isoprene rubber is more than 50% by mass, the resulting rubber composition tends to be deteriorated in rolling resistance performance. The lower limit of the vinyl content of the isoprene rubber is not particularly limited. The glass transition temperature of the isoprene rubber may vary depending upon the vinyl content thereof, and is preferably not higher than −20° C. and more preferably not higher than −30° C.

The weight-average molecular weight (Mw) of the isoprene rubber is preferably from 90,000 to 2,000,000 and more preferably from 150,000 to 1,500,000. When Mw of the isoprene rubber falls within the aforementioned range, the resulting rubber composition can exhibit good processability and good mechanical strength.

The isoprene rubber may partially have a branched structure or may partially contain a polar functional group by using a polyfunctional type modifying reagent, for example, a modifying reagent such as tin tetrachloride, silicon tetrachloride, an alkoxysilane containing an epoxy group in a molecule thereof, and an amino group-containing alkoxysilane.

(Butadiene Rubber (A-III))

The butadiene rubber used in the present invention may be a commercially available butadiene rubber which may be obtained by the polymerization using a Ziegler-based catalyst such as titanium tetrahalide-trialkyl aluminum-based catalysts, diethyl aluminum chloride-cobalt-based catalysts, trialkyl aluminum-boron trifluoride-nickel-based catalysts and diethyl aluminum chloride-nickel-based catalysts; a lanthanoid-based rare earth metal catalyst such as triethyl aluminum-organic acid neodymium salt-Lewis acid-based catalysts; or the organic alkali metal compound as used similarly for production of the S-SBR. Among the butadiene rubbers, preferred are butadiene rubbers obtained by the polymerization using the Ziegler-based catalyst because of a high cis isomer content thereof. In addition, there may also be used those butadiene rubbers having an ultrahigh cis isomer content which are produced using the lanthanoid-based rare earth metal catalyst.

The butadiene rubber preferably has a vinyl content of not more than 50% by mass, more preferably not more than 40% by mass, and even more preferably not more than 30% by mass. When the vinyl content of the butadiene rubber is more than 50% by mass, the resulting rubber composition tends to be deteriorated in rolling resistance performance. The lower limit of the vinyl content of the butadiene rubber is not particularly limited. The glass transition temperature of the butadiene rubber may vary depending upon the vinyl content thereof, and is preferably not higher than −40° C. and more preferably not higher than −50° C.

The weight-average molecular weight (Mw) of the butadiene rubber is preferably from 90,000 to 2,000,000 and more preferably from 150,000 to 1,500,000. When Mw of the butadiene rubber falls within the aforementioned range, the resulting rubber composition can exhibit good processability and good mechanical strength.

The butadiene rubber may partially have a branched structure or may partially contain a polar functional group by using a polyfunctional type modifying reagent, for example, a modifying reagent such as tin tetrachloride, silicon tetrachloride, an alkoxysilane containing an epoxy group in a molecule thereof, and an amino group-containing alkoxysilane.

In addition to at least one rubber selected from the group consisting of the SBR, the isoprene rubber and the butadiene rubber, there may also be used one or more rubbers selected from the group consisting of a butyl rubber, a halogenated butyl rubber, an ethylene-propylene-diene rubber, a butadiene-acrylonitrile copolymer rubber and a chloroprene rubber. The method of producing these rubbers is not particularly limited, and any suitable commercially available rubbers may also be used in the present invention.

In the present invention, when using the SBR, the isoprene rubber, the butadiene rubber and the other synthetic rubber in combination with the below-mentioned silica (B) and the modified polymer (C) of farnesene, it is possible to improve rolling resistance performance, steering stability, mechanical strength and abrasion resistance of the resulting rubber composition.

When using a mixture of two or more kinds of synthetic rubbers, the combination of the synthetic rubbers may be optionally selected unless the effects of the present invention are adversely influenced. Also, various properties of the resulting rubber composition such as rolling resistance performance and abrasion resistance may be appropriately controlled by selecting a suitable combination of the synthetic rubbers.

[Natural Rubber]

Examples of the natural rubber used in the rubber component (A) include TSR such as SMR, SIR and STR; natural rubbers generally used in tire industries, such as RSS; high-purity natural rubbers; and modified natural rubbers such as epoxidized natural rubbers, hydroxylated natural rubbers, hydrogenated natural rubbers and grafted natural rubbers. Among these natural rubbers, SMR20, STR20 and RSS#3 are preferred from the viewpoints of less variation in quality and good availability. These natural rubbers may be used alone or in combination of any two or more thereof.

Meanwhile, the method for producing the rubbers used in the rubber component (A) is not particularly limited, and any suitable commercially available products may also be used in the present invention.

The content of the rubber component (A) in the rubber composition of the present invention is preferably from 20 to 99.9% by mass, more preferably from 25 to 80% by mass, and even more preferably from 30 to 70% by mass.

In the present invention, when using the natural rubber as well as the below-mentioned silica (B) and modified polymer (C) of farnesene in combination with each other, it is possible to improve rolling resistance performance, steering stability, mechanical strength and abrasion resistance of the resulting rubber composition.

<Silica (B)>

Examples of the silica (B) include wet silica (hydrous silicate), dry silica (silicic anhydride), calcium silicate and aluminum silicate. Of these silicas, from the viewpoint of further improving mechanical strength and abrasion resistance of the resulting rubber composition, preferred is wet silica. These silicas may be used alone or in combination of any two or more thereof.

The average particle size of the silica is preferably from 0.5 to 200 nm, more preferably from 5 to 150 nm, and even more preferably from 10 to 100 nm, from the viewpoint of improving processability, rolling resistance performance, mechanical strength and abrasion resistance of the resulting rubber composition.

Meanwhile, the average particle size of the silica may be determined by measuring diameters of respective particles of the silica using a transmission electron microscope to calculate an average value of the thus measured diameters.

The content of the silica (B) in the rubber composition is from 20 to 150 parts by mass, preferably from 30 to 130 parts by mass, and more preferably from 40 to 120 parts by mass, on the basis of 100 parts by mass of the rubber component (A), from the viewpoint of improving rolling resistance performance, mechanical strength and abrasion resistance of the resulting rubber composition.

<Modified Polymer (C) of Farnesene Obtained by Introducing Functional Group into Polymer of Farnesene>

The rubber composition of the present invention contains a modified polymer (C) of farnesene obtained by introducing a functional group into a polymer of farnesene (hereinafter also referred to merely as a "modified polymer (C)"). In the present invention, since the rubber component (A), the silica (B) and the modified polymer (C) are used in combination with each other, it is possible to obtain the rubber composition capable of providing a rubber molded article that is excellent in rolling resistance performance, steering stability, mechanical strength and abrasion resistance.

As the farnesene constituting the modified polymer (C) used in the present invention, there may be used at least one compound selected from the group consisting of α-farnesene and β-farnesene represented by the following formula (I). From the viewpoints of facilitating production of the modified polymer and improving rolling resistance performance of the resulting rubber composition, of these compounds, β-farnesene is preferably used.

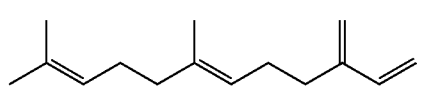

(I)

The modified polymer (C) may be produced, for example, by preparing a polymer of farnesene (hereinafter also referred to as an "unmodified polymer") and introducing a functional group into the unmodified polymer.

(Method for Producing Unmodified Polymer)

The unmodified polymer may be produced by an emulsion polymerization method, the methods described in WO 2010/027463A and WO 2010/027464A or the like. Among these methods, preferred are an emulsion polymerization method and a solution polymerization method, and more preferred is a solution polymerization method.

The emulsion polymerization method used for producing the unmodified polymer may be any suitable conventionally known method. For example, a predetermined amount of a farnesene monomer is emulsified and dispersed in the presence of an emulsifying agent, and then the resulting emulsion is subjected to emulsion polymerization using a radical polymerization initiator.

As the emulsifying agent, there may be used, for example, a long-chain fatty acid salt having 10 or more carbon atoms or a rosinic acid salt. Specific examples of the emulsifying agent include potassium salts and sodium salts of fatty acids such as capric acid, lauric acid, myristic acid, palmitic acid, oleic acid and stearic acid.

As the dispersant for the emulsion polymerization, there may be usually used water, and the dispersant may also contain a water-soluble organic solvent such as methanol and ethanol unless the use of such an organic solvent gives any adverse influence on stability of the polymerization.

Examples of the radical polymerization initiator include persulfates such as ammonium persulfate and potassium persulfate; and organic peroxides and hydrogen peroxide.

In order to suitably adjust a molecular weight of the resulting unmodified polymer, there may also be used a chain transfer agent. Examples of the chain transfer agent include mercaptans such as t-dodecyl mercaptan and n-dodecyl mercaptan; and carbon tetrachloride, thioglycolic acid, diterpene, terpinolene, γ-terpinene and an α-methylstyrene The temperature used upon the emulsion polymerization may be appropriately determined according to the kind of radical polymerization initiator used therein, and is usually preferably from 0 to 100° C. and more preferably from 0 to 60° C. The polymerization method may be either a continuous polymerization method or a batch polymerization method. The polymerization reaction may be stopped by adding a terminating reagent to the reaction system.

Examples of the terminating reagent include amine compounds such as isopropyl hydroxyl amine, diethyl hydroxyl amine and hydroxyl amine; quinone-based compounds such as hydroquinone and benzoquinone; and sodium nitrite.

After terminating the polymerization reaction, an antioxidant may be added, if required. Furthermore, after terminating the polymerization reaction, unreacted monomers may be removed from the resulting latex, if required. Thereafter, the resulting unmodified polymer is coagulated by adding a salt such as sodium chloride, calcium chloride and potassium chloride as a coagulant thereto, if required, while adjusting a pH value of the coagulation system by adding an acid such as nitric acid and sulfuric acid thereto, and then the dispersing solvent is separated from the reaction solution to recover the unmodified polymer. The thus recovered polymer is washed with water and dehydrated, and then dried to obtain the unmodified polymer. Meanwhile, upon coagulating the polymer, the latex may be previously mixed, if required, with an extender oil in the form of an emulsified dispersion to recover the unmodified polymer in the form of an oil-extended rubber.

The solution polymerization method for producing the unmodified polymer may be any suitable conventionally known method. For example, a farnesene monomer may be polymerized in a solvent using a Ziegler-based catalyst, a metallocene-based catalyst or an anion-polymerizable active metal, if required, in the presence of a polar compound.

Examples of the anion-polymerizable active metal include alkali metals such as lithium, sodium and potassium; alkali earth metals such as beryllium, magnesium, calcium, strontium and barium; and lanthanoid-based rare earth metals such as lanthanum and neodymium. Among these active metals, preferred are alkali metals and alkali earth metals, and more preferred are alkali metals. The alkali metals are even more preferably used in the form of an organic alkali metal compound.

Examples of the solvent used in the solution polymerization include aliphatic hydrocarbons such as n-butane, n-pentane, isopentane, n-hexane, n-heptane and isooctane; alicyclic hydrocarbons such as cyclopentane, cyclohexane and methyl cyclopentane; and aromatic hydrocarbons such as benzene, toluene and xylene.

Specific examples of the organic alkali metal compound include organic monolithium compounds such as methyl lithium, ethyl lithium, n-butyl lithium, sec-butyl lithium, t-butyl lithium, hexyl lithium, phenyl lithium and stilbene lithium; polyfunctional organic lithium compounds such as dilithiomethane, dilithionaphthalene, 1,4-dilithiobutane, 1,4-dilithio-2-ethyl cyclohexane and 1,3,5-trilithiobenzene; and sodium naphthalene and potassium naphthalene. Among these organic alkali metal compounds, preferred are organic lithium compounds, and more preferred are organic monolithium compounds. The amount of the organic alkali metal compound used may be appropriately determined according to a molecular weight of the farnesene polymer as required, and is preferably from 0.01 to 3 parts by mass on the basis of 100 parts by mass of farnesene.

The organic alkali metal compound may be used in the form of an organic alkali metal amide by allowing a secondary amine such as dibutyl amine, dihexyl amine and dibenzyl amine to react therewith.

The polar compound may be used in the anion polymerization for controlling a microstructure of farnesene moieties without causing deactivation of the reaction. Examples of the polar compound include ether compounds such as dibutyl ether, tetrahydrofuran and ethylene glycol diethyl ether; tertiary amines such as tetramethyl ethylenediamine and trimethylamine; and alkali metal alkoxides and phosphine compounds. The polar compound is preferably used in an amount of from 0.01 to 1,000 mol equivalent on the basis of the organic alkali metal compound.

The temperature used in the above polymerization reaction is usually from −80 to 150° C., preferably from 0 to 100° C. and more preferably from 10 to 90° C. The polymerization method may be either a batch method or a continuous method.

[Construction of Unmodified Polymer]

The unmodified polymer may be constituted of a monomer unit (c1) derived from β-farnesene solely, or may be constituted of the monomer unit (c1) derived from β-farnesene and a monomer unit (c2) derived from a monomer other than β-farnesene.

In the case where the unmodified polymer is in the form of a copolymer, examples of the monomer unit (c2) derived from a monomer other than β-farnesene include a conjugated diene having not more than 12 carbon atoms and an aromatic vinyl compound.

Examples of the conjugated diene having not more than 12 carbon atoms include butadiene, isoprene, 2,3-dimethylbutadiene, 2-phenyl-butadiene, 1,3-pentadiene, 2-methyl-1,3-pentadiene, 1,3-hexadiene, 1,3-octadiene, 1,3-cyclohexadiene, 2-methyl-1,3-octadiene, 1,3,7-octatriene, myrcene and chloroprene. Of these conjugated dienes, preferred are butadiene, isoprene and myrcene. These conjugated dienes may be used alone or in combination of any two or more thereof.

Examples of the aromatic vinyl compound include styrene, a-methylstyrene, 2-methylstyrene, 3-methylstyrene, 4-methylstyrene, 4-propylstyrene, 4-t-butylstyrene, 4-cyclohexylstyrene, 4-dodecylstyrene, 2,4-dimethylstyrene, 2,4-diisopropylstyrene, 2,4,6-trimethylstyrene, 2-ethyl-4-benzylstyrene, 4-(phenyl butyl)styrene, 1-vinylnaphthalene, 2-vinylnaphthalene, vinylanthracene, N,N-diethyl-4-aminoethylstyrene, vinylpyridine, 4-methoxystyrene, monochlorostyrene, dichlorostyrene and divinylbenzene. Of these aromatic vinyl compounds, preferred are styrene, α-methylstyrene and 4-methylstyrene.

The proportion of the monomer unit (c2) derived from a monomer other than β-farnesene to a sum of the monomer unit (c2) and the monomer unit (c1) derived from β-farnesene is preferably from 1 to 99% by mass, more preferably from 10 to 80% by mass, and even more preferably from 15 to 80% by mass, from the viewpoint of improving processability and rolling resistance performance of the resulting rubber composition. Also, from the viewpoint of improving abrasion resistance of the resulting rubber composition, the proportion of the monomer unit (c2) to a sum of the monomer unit (c2) and the monomer unit (c1) is preferably from 40 to 80% by mass, and more preferably from 60 to 80% by mass. In addition, from the viewpoint of improving processability of the resulting rubber composition, the proportion of the monomer unit (c2) to a sum of the monomer unit (c2) and the monomer unit (c1) is preferably from 20 to 60% by mass, and more preferably from 20 to 40% by mass.

The monomer unit (c2) derived from a monomer other than β-farnesene is more preferably butadiene from the viewpoint of improving rolling resistance performance and abrasion resistance of the resulting rubber composition.

[Method of Modifying Unmodified Polymer]

The modified polymer (C) may be produced by any suitable modifying method such as (I) a method of adding to the unmodified polymer, a modifying reagent such as tetraethoxysilane, carbon dioxide and ethyleneoxide which is capable of reacting with an active end of the unmodified polymer chain, prior to adding a terminating reagent thereto, (II) a method of grafting a modifying reagent such as maleic anhydride to the unmodified polymer after adding a terminating reagent thereto, etc.

Examples of the functional group to be introduced into the unmodified farnesene polymer include an amino group, an ammonium group, an amide group, an imino group, an imidazole group, a urea group, an alkoxysilyl group, a silanol group, a hydroxy group, an epoxy group, an ether group, a carboxy group, a carbonyl group, a carboxylate group, a sulfonic group, a sulfonate group, a phosphoric group, a phosphate group, a mercapto group, an isocyanate group, a nitrile group, a silicon halide group, a tin halide group and a functional group derived from an acid anhydride. Of these groups, preferred is at least one group selected from the group consisting of a carboxy group, an amino group, a hydroxy group and the functional group derived from an acid anhydride. As the functional group derived from an acid anhydride, more preferred is a functional group derived from maleic anhydride.

In the modified polymer, the site of the polymer into which the functional group is introduced may be either a chain end or a side chain of the polymer.

Examples of the modifying reagent that may be used in the aforementioned method (I) include those modifying reagents such as dimethyl diethoxysilane, tetramethoxysilane, tetraethoxysilane, 3-aminopropyl triethoxysilane, tetraglycidyl-1,3-bisaminomethyl cyclohexane, 2,4-tolylene diisocyanate, carbon dioxide, ethyleneoxide, succinic anhydride, 4,4'-bis(diethylamino)benzophenone, N-vinyl pyrrolidone, N-methyl pyrrolidone, 4-dimethylaminobenzylidene aniline and dimethyl imidazolidinone, or the other modifying reagents as described in JP 2011-132298A.

The modifying reagent is preferably used in an amount of from 0.01 to 100 mol equivalent on the basis of the organic alkali metal compound. The reaction temperature is usually in the range of from −80 to 150° C., preferably from 0 to 100° C., and more preferably from 10 to 90° C.

In addition, after introducing the functional group into the unmodified polymer by adding the aforementioned modifying reagent to the unmodified polymer prior to adding the terminating reagent thereto, an additional modifying reagent capable of reacting with the functional group may be added to the resulting polymer to introduce the other functional group thereinto.

Examples of the modifying reagent that may be used in the aforementioned method (II) include unsaturated carboxylic acid anhydrides such as maleic anhydride, citraconic anhydride, 2,3-dimethyl maleic anhydride and itaconic anhydride; unsaturated carboxylic acids such as maleic acid, fumaric acid, citraconic acid and itaconic acid; unsaturated carboxylic acid esters such as a maleic acid ester, a fumaric acid ester, a citraconic acid ester and an itaconic acid ester; unsaturated carboxylic acid amides such as a maleic acid amide, a fumaric acid amide, a citraconic acid amide and an itaconic acid amide; unsaturated carboxylic acid imides such as a maleic acid imide, a fumaric acid imide, a citraconic acid imide and an itaconic acid imide; and maleimide, vinyl trimethoxysilane, γ-methacryloxypropyl trimethoxysilane, etc.

In the aforementioned method (II), the method of grafting the modifying reagent to the unmodified farnesene polymer is not particularly limited, and there may be adopted, for example, such a method in which the unmodified farnesene polymer and the modifying reagent as well as, if required, a radical catalyst, are charged and heated in the presence or non-presence of an organic solvent. Examples of the organic solvent generally used in the above method include hydrocarbon-based solvents and halogenated hydrocarbon-based solvents. Of these organic solvents, preferred are hydrocarbon-based solvents such as n-butane, n-hexane, n-heptane, cyclohexane, benzene, toluene and xylene.

The modifying reagent is preferably used in an amount of from 0.1 to 100 parts by mass, and more preferably from 0.5 to 50 parts by mass, on the basis of 100 parts by mass of the unmodified polymer. The reaction temperature is usually in the range of preferably from 0 to 200° C., and more preferably from 50 to 200° C. When conducting the reaction for introducing the modifying reagent into the unmodified polymer, an antioxidant may be added from the viewpoint of suppressing occurrence of side reactions, etc.

Furthermore, after grafting the modifying reagent to the unmodified polymer to introduce the functional group thereinto, an additional modifying reagent capable of reacting with the functional group may be further added to the resulting polymer to introduce the other functional group thereinto. More specifically, there may be used such a method in which after grafting a carboxylic acid anhydride onto the unmodified polymer obtained by living polymerization, the resulting polymer is then reacted with a compound such as 2-hydroxyethyl methacrylate, methanol, water, ammonia, an amine, etc.

When the above compound is reacted with the modified polymer (C), the carboxylic acid anhydride moiety in the modified polymer (C) undergoes ring-opening reaction, so that it is possible to obtain the modified polymer (C) containing a functional group such as a dicarboxylic acid group, a dicarboxylic acid monoester group and a dicarboxylic acid monoamide group. In the case where the carboxylic acid anhydride moiety in the modified polymer (C) is subjected to ring-opening reaction to produce a secondarily modified product of the modified polymer (C), the amount of the compound used in the ring-opening reaction is preferably from 0.5 to 5 mol equivalent, and more preferably from 0.8 to 5 mol equivalent, on the basis of the carboxylic acid anhydride group in the polymer. By conducting the secondary modification of the polymer, it is possible to enhance elastic modulus and steering stability of the resulting rubber composition.

The reaction ratio of the above modifying reagent to the modified polymer (C) is preferably from 40 to 100%, more preferably from 60 to 100%, and even more preferably from 80 to 100%. When the reaction ratio of the above modifying reagent lies within the aforementioned range, the resulting rubber composition can exhibit good rolling resistance performance, mechanical strength, hardness and abrasion resistance. Meanwhile, the reaction ratio of the modifying reagent may be calculated as a ratio of the amount of the modifying reagent introduced into the polymer to a whole amount of the modifying reagent charged upon the modification reaction.

The weight-average molecular weight (Mw) of the modified polymer (C) is preferably from 2,000 to 500,000, more preferably from 8,000 to 500,000, even more preferably from 15,000 to 450,000, and further even more preferably from 30,000 to 300,000. When Mw of the modified polymer (C) lies within the aforementioned range, the rubber composition of the present invention can exhibit good processability, and can be improved in dispersibility of silica therein and therefore can exhibit good rolling resistance performance.

When the weight-average molecular weight (Mw) of the modified polymer (C) is more than 30,000, crosslinking of the modified polymer (C) with the rubber component in the rubber composition is likely to occur, so that the resulting rubber composition can exhibit good abrasion resistance.

Meanwhile, Mw of the modified polymer (C) as described in the present specification is the value determined by the method described in Examples below.

In the present invention, two kinds of modified polymers (C) which are different in Mw from each other may be used in combination with each other.

The weight-average molecular weight (Mw) of the modified polymer in the form of a copolymer is preferably from 2,000 to 500,000, more preferably from 8,000 to 300,000, even more preferably from 14,000 to 200,000, and further even more preferably from 20,000 to 100,000, from the viewpoint of further improving rolling resistance performance of the resulting rubber composition.

The melt viscosity of the modified polymer (C) as measured at 38° C. is preferably from 0.1 to 3,000 Pa·s, more preferably from 1.0 to 2,000 Pa·s, even more preferably from 2.5 to 1,500 Pa·s, and further even more preferably from 4.0 to 1,000 Pa·s. When the melt viscosity of the modified polymer (C) lies within the aforementioned range, the resulting rubber composition can be readily kneaded and can be improved in processability. Meanwhile, the melt viscosity of the modified polymer (C) as used in the present invention means the value determined by the method described in Examples below.

The molecular weight distribution (Mw/Mn) of the modified polymer (C) is preferably from 1.0 to 8.0, more preferably from 1.0 to 5.0, and even more preferably from 1.0 to 3.0. When Mw/Mn of the modified polymer (C) lies within the aforementioned range, the resulting modified polymer (C) can exhibit less variation in viscosity thereof.

The glass transition temperature of the modified polymer (C) is preferably from −90 to 10° C., more preferably from −90 to 0° C., and even more preferably from −90 to −5° C. When the glass transition temperature of the modified polymer (C) lies within the aforementioned range, the resulting rubber composition can exhibit good rolling resistance performance, and can be prevented from suffering from increase in viscosity thereof, which results in easiness of handling thereof.

The amount of the functional group added to the modified polymer (C) (amount of the modifying reagent) is preferably from 0.1 to 100 parts by mass, and more preferably from 0.2 to 50 parts by mass, on the basis of 100 parts by mass of the unmodified polymer. When the amount of the functional group added to the modified polymer (C) lies within the aforementioned range, the resulting rubber composition can exhibit good rolling resistance performance, mechanical strength, hardness and abrasion resistance. Meanwhile, the amount of the functional group added to the modified polymer (C) may be calculated from the reaction ratio of the modifying reagent, or may be determined by the method as described in Examples below.

The average number of functional groups introduced per one molecule of the modified polymer (C) is in the range of from 0.1 to 300, preferably from 3 to 250, and more preferably from 5 to 200. When the average number of functional groups introduced per one molecule of the modified polymer (C) lies within the aforementioned range, the resulting rubber composition can be improved in dispersibility of the silica (B) therein, so that the tire, etc., obtained from a crosslinked product of the rubber composition can be improved in rolling resistance performance, and further can exhibit less deformation and excellent steering stability. In addition, the crosslinked product of the rubber composition can be further improved in abrasion resistance.

The average number of functional groups introduced per one molecule of the modified polymer (C) may be determined by the below-mentioned $^1$H-NMR.

In addition, the equivalent amount of the functional group of the modified polymer (C) is preferably in the range of from 150 to 6,500 g/eq, more preferably from 200 to 5,000 g/eq, and even more preferably from 300 to 3,000 g/eq. When the equivalent amount of the functional group of the modified polymer (C) lies within the aforementioned range, the resulting rubber composition can be improved in dispersibility of the silica (B) therein, so that the tire, etc., obtained from a crosslinked product of the rubber composition can be improved in rolling resistance performance, etc., and further can exhibit less deformation and excellent steering stability. In addition, the crosslinked product of the rubber composition can be further improved in abrasion resistance.

Meanwhile, the equivalent amount of the functional group as described in the present specification means a mass of farnesene bonded per one functional group and the monomer other than farnesene which may be contained in the polymer, if required. The equivalent amount of the functional group may be calculated from an area ratio between a peak derived from the functional group and a peak derived from a main chain of the polymer which are measured using $^1$H-NMR or $^{13}$C-NMR, or may be calculated from the measurement results of the below-mentioned acid value, etc.

In the modified polymer (C), the site of the polymer into which the functional group is introduced may be either a terminal end of the polymer or a side chain of the polymer. Of these sites, from the viewpoint of readily introducing a plurality of functional groups into the polymer, the side chain of the polymer is preferred. Also, only one kind of functional group may be introduced into the polymer, or two or more kinds of functional groups may be introduced thereinto. Therefore, the modified polymer (C) may be in the form of either a polymer modified with a single kind of modifying compound or a polymer modified with two or more kinds of modifying compounds.

In the present invention, the content of the modified polymer (C) in the rubber composition is from 2 to 10 parts by mass, and preferably from 2.5 to 9.5 parts by mass, on the basis of 100 parts by mass of the silica (B). When the content of the modified polymer (C) in the rubber composition lies within the aforementioned range, the resulting rubber composition can exhibit good mechanical strength and rolling resistance performance as well as excellent abrasion resistance, so that tires, etc., produced from the rubber composition can exhibits less deformation and can be improved in steering stability.

<Fillers>

The rubber composition of the present invention may contain a filler other than silica, such as carbon black.

[Carbon Black]

Examples of the carbon black include various carbon blacks such as furnace black, channel black, thermal black, acetylene black and Ketjen black. Among these carbon blacks, from the viewpoints of a high vulcanization rate and an improved mechanical strength of the rubber composition, preferred is furnace black.

The carbon black preferably has an average particle size of from 5 to 100 nm, more preferably from 5 to 80 nm, and even more preferably from 5 to 70 nm, from the viewpoint of improving dispersibility, mechanical strength and hardness of the resulting rubber composition.

Examples of commercially available furnace black as the carbon black having an average particle size of from 5 to 100 nm include "DIABLACK" available from Mitsubishi Chemical Corp., and "SEAST" available from Tokai Carbon Co., Ltd. Examples of commercially available acetylene black as the carbon black having an average particle size of from 5 to 100 nm include "DENKABLACK" available from Denki Kagaku Kogyo K.K. Examples of commercially available Ketjen black as the carbon black having an average particle size of from 5 to 100 nm include "ECP600JD" available from Lion Corp.

The carbon black may be subjected to an acid treatment with nitric acid, sulfuric acid, hydrochloric acid or a mixed acid thereof or may be subjected to a heat treatment in the presence of air for a surface oxidation treatment thereof, from the viewpoint of improving wettability or dispersibility of the carbon black in the rubber component (A) and the modified polymer (C). In addition, from the viewpoint of improving mechanical strength of the rubber composition of the present invention, the carbon black may be subjected to a heat treatment at a temperature of from 2,000 to 3,000° C. in the presence of a graphitization catalyst. As the graphitization catalyst, there may be suitably used boron, boron oxides (such as, for example, $B_2O_2$, $B_2O_3$, $B_4O_3$ and $B_4O_5$), oxo acids of boron (such as, for example, orthoboric acid, metaboric acid and tetraboric acid) and salts thereof, boron carbonates (such as, for example, $B_4C$ and $B_6C$), boron nitride (such as BN) and other boron compounds.

The particle size of the carbon black may be controlled by pulverization or the like. In order to pulverize the carbon black, there may be used a high-speed rotary mill (such as a hammer mill, a pin mil and a cage mill) or various ball mills (such as a rolling mill, a vibration mill and a planetary mill), a stirring mill (such as a beads mill, an attritor, a flow tube mill and an annular mill) or the like.

Meanwhile, the average particle size of the carbon black may be determined by calculating an average value of diameters of carbon black particles measured using a transmission type electron microscope.

[Other Fillers]

For the purposes of enhancing mechanical strength of the rubber composition, controlling a hardness thereof, and further improving economy by adding an extender thereto, the rubber composition of the present invention may also contain a filler other than the silica and carbon black, if required.

The filler other than the silica and carbon black may be appropriately selected according to the applications of the obtained rubber composition. For example, as the filler other than the silica and carbon black, there may be used one or more fillers selected from the group consisting of organic fillers, and inorganic fillers such as clay, talc, mica, calcium carbonate, magnesium hydroxide, aluminum hydroxide, barium sulfate, titanium oxide, glass fibers, fibrous fillers and glass balloons.

In the case where the above filler is compounded in the rubber composition of the present invention, the content of the filler in the rubber composition is from 0.1 to 120 parts by mass, more preferably from 5 to 90 parts by mass, and even more preferably from 10 to 80 parts by mass on the basis of 100 parts by mass of the rubber component (A). When the content of the filler in the rubber composition falls within the aforementioned range, the resulting rubber composition can be furthermore improved in mechanical strength.

<Vulcanizing Agent>

The rubber composition of the present invention preferably contains a vulcanizing agent. Examples of the vulcanizing agent include sulfur and a sulfur compound. These vulcanizing agents may be used alone or in combination of any two or more thereof. The content of the vulcanizing agent in the rubber composition is from 0.1 to 10 parts by mass, more preferably from 0.5 to 10 parts by mass, and even more preferably from 0.8 to 5 parts by mass on the basis of 100 parts by mass of the rubber component (A).

<Vulcanization Accelerator>

The rubber composition of the present invention may also contain a vulcanization accelerator. Examples of the vulcanization accelerator include guanidine-based compounds, sulfene amide-based compounds, thiazole-based compounds, thiuram-based compounds, thiourea-based compounds, dithiocarbamic acid-based compounds, aldehyde-amine-based compounds or aldehyde-ammonia-based compounds, imidazoline-based compounds and xanthate-based compounds. These vulcanization accelerators may be used alone or in combination of any two or more thereof. The content of the vulcanization accelerator in the rubber composition of the present invention is preferably from 0.1 to 15 parts by mass, and more preferably from 0.1 to 10 parts by mass, on the basis of 100 parts by mass of the rubber component (A).

<Vulcanization Aid>

The rubber composition of the present invention may also contain a vulcanization aid. Examples of the vulcanization aid include fatty acids such as stearic acid, metal oxides such as zinc oxide, and fatty acid metal salts such as zinc stearate. These vulcanization aids may be used alone or in combination of any two or more thereof. In the case where the rubber composition of the present invention contains the vulcanization aid, the content of the vulcanization aid in the rubber composition is preferably from 0.1 to 15 parts by mass, and more preferably from 1 to 10 parts by mass, on the basis of 100 parts by mass of the rubber component (A).

<Silane Coupling Agent>

The rubber composition of the present invention also preferably contains a silane coupling agent. As the silane coupling agent, there may be used a sulfide-based compound, a mercapto-based compound, a vinyl-based compound, an amino-based compound, a glycidoxy-based compound, a nitro-based compound, a chloro-based compound, etc.

Examples of the sulfide-based compound include bis(3-triethoxysilylpropyl)tetrasulfide, bis(2-triethoxysilylethyl) tetrasulfide, bis(3-trimethoxysilylpropyl)tetrasulfide, bis(2-trimethoxysilylethyl)tetrasulfide, bis(3-triethoxysilylpropyl)trisulfide, bis(3-trimethoxysilylpropyl)trisulfide, bis(3-triethoxysilylpropyl)disulfide, bis(3-trimethoxysilylpropyl)disulfide, 3-trimethoxysilylpropyl-N,N-dimethyl thiocarbamoyl tetrasulfide, 3-triethoxysilylpropyl-N,N-dimethyl thiocarbamoyl tetrasulfide, 2-trimethoxysilylethyl-N,N-dimethyl thiocarbamoyl tetrasulfide, 3-trimethoxysilylpropyl benzothiazole tetrasulfide, 3-triethoxysilylpropyl benzothiazole tetrasulfide, 3-triethoxysilylpropyl methacrylate monosulfide and 3-trimethoxysilylpropyl methacrylate monosulfide.

Examples of the mercapto-based compound include 3-mercaptopropyl trimethoxysilane, 3-mercaptopropyl triethoxysilane, 2-mercaptoethyl trimethoxysilane and 2-mercaptoethyl triethoxysilane.

Examples of the vinyl-based compound include vinyl triethoxysilane and vinyl trimethoxysilane.

Examples of the amino-based compound include 3-aminopropyl triethoxysilane, 3-aminopropyl trimethoxysilane, 3-(2-aminoethyl)aminopropyl triethoxysilane and 3-(2-aminoethyl)aminopropyl trimethoxysilane.

Examples of the glycidoxy-based compound include γ-glycidoxypropyl triethoxysilane, γ-glycidoxypropyl trimethoxysilane, γ-glycidoxypropyl methyl diethoxysilane and γ-glycidoxypropyl methyl dimethoxysilane.

Examples of the nitro-based compound include 3-nitropropyl trimethoxysilane and 3-nitropropyl triethoxysilane.

Examples of the chloro-based compound include 3-chloropropyl trimethoxysilane, 3-chloropropyl triethoxysilane, 2-chloroethyl trimethoxysilane and 2-chloroethyl triethoxysilane.

These silane coupling agents may be used alone or in combination of any two or more thereof. Of these silane coupling gents, from the viewpoints of attaining a high reinforcing effect, preferred are sulfur-containing silane coupling agents such as sulfide-based compounds and mercapto-based compounds, and more preferred are bis(3-triethoxysilylpropyl)disulfide, bis(3-triethoxysilylpropyl)tetrasulfide and 3-mercaptopropyl trimethoxysilane.

The content of the silane coupling agent in the rubber composition is preferably from 0.1 to 30 parts by mass, more preferably from 0.5 to 20 parts by mass, and even more preferably from 1 to 15 parts by mass, on the basis of 100 parts by mass of the silica (B). When the content of the silane coupling agent in the rubber composition falls within the aforementioned range, the resulting rubber composition can be enhanced in dispersibility, reinforcing properties and abrasion resistance.

<Other Components>

The rubber composition of the present invention may also contain a softening agent, if required, for the purpose of improving processability, flowability or the like of the resulting rubber composition unless the effects of the present invention are adversely influenced. Examples of the softening agent include a process oil such as a silicone oil, an aroma oil, TDAE (treated distilled aromatic extracts), MES (mild extracted solvates), RAE (residual aromatic extracts), a paraffin oil and a naphthene oil; a resin component such as aliphatic hydrocarbon resins, alicyclic hydrocarbon resins, C9-based resins, rosin-based resins, coumarone-indene-based resins and phenol-based resins; a liquid polymer such as a low-molecular weight polybutadiene, a low-molecular weight polyisoprene, a low-molecular weight styrene-butadiene copolymer and a low-molecular weight styrene-isoprene copolymer; and the unmodified polymer. Meanwhile, the above copolymers may be in the form of either a block copolymer or a random copolymer. The liquid polymer preferably has a weight-average molecular weight (Mw) of from 500 to 100,000 from the viewpoint of a good processability of the resulting rubber composition. In the case where the above process oil, resin component, liquid polymer or unmodified polymer is compounded as a softening agent in the rubber composition of the present invention, the content of the softening agent in the rubber composition is preferably less than 50 parts by mass on the basis of 100 parts by mass of the rubber component (A).

The rubber composition of the present invention may also contain, if required, one or more additives selected from the group consisting of an antioxidant, an oxidation inhibitor, a wax, a lubricant, a light stabilizer, a scorch retarder, a processing aid, a colorant such as pigments and coloring matters, a flame retardant, an antistatic agent, a delustering agent, an anti-blocking agent, an ultraviolet absorber, a release agent, a foaming agent, an antimicrobial agent, a mildew-proofing agent and a perfume, for the purposes of improving weathering resistance, heat resistance, oxidation resistance or the like of the resulting rubber composition, unless the effects of the present invention are adversely influenced.

Examples of the oxidation inhibitor include hindered phenol-based compounds, phosphorus-based compounds, lactone-based compounds and hydroxyl-based compounds.

Examples of the antioxidant include amine-ketone-based compounds, imidazole-based compounds, amine-based compounds, phenol-based compounds, sulfur-based compounds and phosphorus-based compounds.

The rubber composition of the present invention may be used not only in the form of a vulcanized product produced by adding the aforementioned vulcanizing agent thereto, but also in the form of a crosslinked product produced by adding a crosslinking agent thereto. Examples of the crosslinking agent include oxygen, organic peroxides, phenol resins and amino resins, quinone and quinone dioxime derivatives, halogen compounds, aldehyde compounds, alcohol compounds, epoxy compounds, metal halides and organic metal halides, and silane compounds. These crosslinking agents may be used alone or in combination of any two or more thereof. The content of the crosslinking agent in the rubber composition is preferably from 0.1 to 10 parts by mass on the basis of 100 parts by mass of the rubber component (A).

The method for producing the rubber composition of the present invention is not particularly limited, and any suitable method may be used in the present invention as long as the respective components are uniformly mixed with each other. The method of uniformly mixing the respective components may be carried out, for example, using a closed kneader of a tangential type or a meshing type such as a kneader rudder, a Brabender, a Banbury mixer and an internal mixer, a single-screw extruder, a twin-screw extruder, a mixing roll, a roller or the like. The mixing may be conducted in a temperature range of usually from 70 to 270° C.

The rubber composition of the present invention may be vulcanized and used as a vulcanized rubber. The vulcanizing conditions and method are not particularly limited. However, the vulcanization process is preferably carried out using a vulcanizing mold under the pressurizing and heating conditions, more specifically, at a vulcanizing temperature of from 120 to 200° C. under a vulcanizing pressure of 0.5 to 2.0 MPa.

[Tire]

The tire according to the present invention is produced by using the rubber composition of the present invention in at least a part thereof, and therefore can exhibit a good mechanical strength and an excellent rolling resistance performance. Furthermore, the tire produced using the rubber composition of the present invention can maintain various excellent properties such as the aforementioned mechanical strength even when used for a long period of time.

EXAMPLES

The present invention will be described in more detail below by referring to the following examples. It should be noted, however, that the following examples are only illustrative and not intended to limit the invention thereto.

The respective components used in the following Examples and Comparative Examples are as follows.

Rubber Component (A):
Natural Rubber: "STR20" (natural rubber from Thailand)
Oil-Extended Styrene-Butadiene Rubber: "JSR1723" available from JSR Corporation; weight-average molecular weight (Mw): 850,000; styrene content: 23.5% by mass (produced by emulsion polymerization method); oil content: 27.3%

Silica (B):
"ULTRASIL7000GR" available from Evonik Degussa Japan Co., Ltd.; wet silica; average particle size: 14 nm Modified Polymer (C):
Modified polyfarnesenes (C-1) to (C-4) and (C-17) produced in the following Production Examples 1 to 4 and 17
Modified farnesene copolymers (C-5) to (C-16) produced in the following Production Examples 5 to 16

Polyisoprene:
Polyisoprenes (X-1) and (X-2) produced in the following Comparative Production Examples 1 and 2

Polyfarnesene:
Polyfarnesene (X-3) produced in the following Comparative Production Example 3

TDAE:
"VivaTec500" available from H & R Corp.

Silane Coupling Agent (1):
"Si75" available from Evonik Degussa Japan Co., Ltd.

Silane Coupling Agent (2):
"Si69" available from Evonik Degussa Japan Co., Ltd.

Antioxidant (1):
"NOCRAC 6C" available from Ouchi Shinko Chemical Industrial Co., Ltd.

Antioxidant (2):
"ANTAGE RD" available from Kawaguchi Chemical Industry Co., Ltd.

Wax:
"SUNTIGHT S" available from Seiko Chemical Co., Ltd.

Vulcanizing Agent:
Sulfur (sulfur fine powder 200 mesh) available from Tsurumi Chemical Industry Co., Ltd.

Vulcanization Accelerator:
Vulcanization Accelerator (1): "NOCCELER NS-P" available from Ouchi Shinko Chemical Industrial Co., Ltd.
Vulcanization Accelerator (2): "NOCCELER CZ-G" available from Ouchi Shinko Chemical Industrial Co., Ltd.
Vulcanization Accelerator (3): "NOCCELER D" available from Ouchi Shinko Chemical Industrial Co., Ltd.
Vulcanization Accelerator (4): "NOCCELER TBT-N" available from Ouchi Shinko Chemical Industrial Co., Ltd.

Vulcanization Aid:
Stearic acid: "LUNAC S-20" available from Kao Corporation
Zinc oxide: "Zinc Oxide" available from Sakai Chemical Industry Co., Ltd.

Production Example 1

Production of Maleic Anhydride-modified Polyfarnesene (C-1)

A pressure reaction vessel previously purged with nitrogen and then dried was charged with 274 g of hexane as a solvent and 1.2 g of n-butyl lithium (in the form of a 17% by mass hexane solution) as an initiator. The contents of the reaction vessel were heated to 50° C., and 272 g of β-farnesene was added thereto and polymerized for 1 h. The resulting polymerization reaction solution was treated with methanol and then washed with water. After separating water from the thus washed polymerization reaction solution, the resulting solution was dried at 70° C. for 12 h, thereby obtaining an unmodified polyfarnesene.

Next, 250 g of the thus obtained unmodified polyfarnesene, 0.25 g of "NOCRAC 6C" as an antioxidant and 1.25 g of maleic anhydride were charged into a pressure reaction vessel. After purging the reaction vessel with nitrogen, the contents of the reaction vessel were heated to 170° C. and reacted at that temperature for 20 h, thereby obtaining a maleic anhydride-modified polyfarnesene (C-1) having properties shown in Table 1. Meanwhile, the reaction ratio of the modifying reagent was 53%, and the amount of the functional group added into the modified polymer (C-1) was 0.3 part by mass on the basis of 100 parts by mass of the unmodified polymer.

Production Example 2

Production of Maleic Anhydride-modified Polyfarnesene (C-2)

A pressure reaction vessel previously purged with nitrogen and then dried was charged with 5,755 g of hexane as a solvent and 26.5 g of n-butyl lithium (in the form of a 17% by mass hexane solution) as an initiator. The contents of the reaction vessel were heated to 50° C., and 5,709 g of β-farnesene was added thereto and polymerized for 1 h. The resulting polymerization reaction solution was treated with methanol and then washed with water. After separating water from the thus washed polymerization reaction solution, the resulting solution was dried at 70° C. for 12 h, thereby obtaining an unmodified polyfarnesene.

Next, 500 g of the thus obtained unmodified polyfarnesene, 0.5 g of "NOCRAC 6C" as an antioxidant and 7.5 g of maleic anhydride were charged into a pressure reaction vessel. After purging the reaction vessel with nitrogen, the contents of the reaction vessel were heated to 170° C. and reacted at that temperature for 24 h, thereby obtaining a maleic anhydride-modified polyfarnesene (C-2) having properties shown in Table 1. Meanwhile, the reaction ratio of the modifying reagent was 87%, and the amount of the functional group added into the modified polymer (C-2) was 1.3 parts by mass on the basis of 100 parts by mass of the unmodified polymer.

Production Example 3

Production of Maleic Anhydride-modified Polyfarnesene (C-3)

A pressure reaction vessel previously purged with nitrogen and then dried was charged with 5,755 g of hexane as a solvent and 26.5 g of n-butyl lithium (in the form of a 17% by mass hexane solution) as an initiator. The contents of the reaction vessel were heated to 50° C., and 5,709 g of β-farnesene was added thereto and polymerized for 1 h. The resulting polymerization reaction solution was treated with methanol and then washed with water. After separating water from the thus washed polymerization reaction solution, the resulting solution was dried at 70° C. for 12 h, thereby obtaining an unmodified polyfarnesene.

Next, 500 g of the thus obtained unmodified polyfarnesene, 0.5 g of "NOCRAC 6C" as an antioxidant and 25 g of maleic anhydride were charged into a pressure reaction vessel. After purging the reaction vessel with nitrogen, the contents of the reaction vessel were heated to 170° C. and reacted at that temperature for 24 h, thereby obtaining a maleic anhydride-modified polyfarnesene (C-3) having properties shown in Table 1. Meanwhile, the reaction ratio of the modifying reagent was 94%, and the amount of the functional group added into the modified polymer (C-3) was 4.7 parts by mass on the basis of 100 parts by mass of the unmodified polymer.

Production Example 4

Production of Maleic Anhydride-modified Polyfarnesene (C-4)

A pressure reaction vessel previously purged with nitrogen and then dried was charged with 1,216 g of cyclohexane as a solvent and 42.6 g of sec-butyl lithium (in the form of a 10.5% by mass cyclohexane solution) as an initiator. The contents of the reaction vessel were heated to 50° C., and 1,880 g of β-farnesene was added thereto and polymerized for 1 h. The resulting polymerization reaction solution was treated with methanol and then washed with water. After separating water from the thus washed polymerization reaction solution, the resulting solution was dried at 70° C. for 12 h, thereby obtaining an unmodified polyfarnesene.

Next, 500 g of the thus obtained unmodified polyfarnesene, 0.5 g of "NOCRAC 6C" as an antioxidant and 7.5 g of maleic anhydride were charged into a pressure reaction vessel. After purging the reaction vessel with nitrogen, the contents of the reaction vessel were heated to 170° C. and reacted at that temperature for 24 h, thereby obtaining a maleic anhydride-modified polyfarnesene (C-4) having properties shown in Table 1. Meanwhile, the reaction ratio of the modifying reagent was 94%, and the amount of the functional group added into the modified polymer (C-4) was 1.4 parts by mass on the basis of 100 parts by mass of the unmodified polymer.

Comparative Production Example 1

Production of Polyisoprene (X-1)

A pressure reaction vessel previously purged with nitrogen and then dried was charged with 600 g of hexane and 13.9 g of n-butyl lithium (in the form of a 17% by mass hexane solution). The contents of the reaction vessel were heated to 70° C., and 1,370 g of isoprene was added thereto and polymerized for 1 h. The resulting polymerization reaction solution was mixed with methanol and then washed with water. After separating water from the thus washed polymerization reaction solution, the resulting solution was dried at 70° C. for 12 h, thereby obtaining a polyisoprene (X-1) having properties shown in Table 1.

Comparative Production Example 2

Production of Polyisoprene (X-2)

A pressure reaction vessel previously purged with nitrogen and then dried was charged with 600 g of hexane and 44.9 g of n-butyl lithium (in the form of a 17% by mass hexane solution). The contents of the reaction vessel were heated to 70° C., and 2,050 g of isoprene was added thereto and polymerized for 1 h. The resulting polymerization reaction solution was mixed with methanol and then washed with water. After separating water from the thus washed polymerization reaction solution, the resulting solution was dried at 70° C. for 12 h, thereby obtaining a polyisoprene (X-2) having properties shown in Table 1.

Meanwhile, the weight-average molecular weight (Mw), molecular weight distribution (Mw/Mn) and melt viscosity of each of the modified polymer (C) and polyisoprene as well as the reaction ratio of the modifying reagent were measured by the following methods.

(Method of Measuring Weight-Average Molecular Weight and Molecular Weight Distribution)

Mw and Mw/Mn of each of the modified polymer (C) and polyisoprene were measured by GPC (gel permeation chromatography) in terms of a molecular weight of polystyrene as a reference standard substance. The measuring devices and conditions are as follows.

Apparatus: GPC device "GPC8020" available from Tosoh Corporation
Separating column: "TSKgelG4000HXL" available from Tosoh Corporation
Detector: "RI-8020" available from Tosoh Corporation
Eluent: Tetrahydrofuran
Eluent flow rate: 1.0 mL/min
Sample concentration: 5 mg/10 mL
Column temperature: 40° C.

(Method of Measuring Melt Viscosity)

The melt viscosity of the modified polymer (C) was measured at 38° C. using a Brookfield-type viscometer available from Brookfield Engineering Labs. Inc.

(Method of Measuring Reaction Ratio of Modifying Reagent)

After adding 180 mL of toluene and 20 mL of ethanol to 3 g of a sample obtained after the modification reaction to dissolve the sample therein, the resulting solution was subjected to neutralization titration with a 0.1N potassium hydroxide ethanol solution to determine an acid value of the sample.

$$\text{Acid Value (mgKOH/g)} = (A-B) \times F \times 5.611/S$$

wherein A is a dropping amount (mL) of the 0.1N potassium hydroxide ethanol solution required for neutralizing the sample solution; B is a dropping amount (mL) of the 0.1N potassium hydroxide ethanol solution required for neutralizing a blank containing no sample; F is a titer of the 0.1N potassium hydroxide ethanol solution; and S is a mass (g) of the sample weighed.

Also, the sample obtained after the modification reaction was washed with methanol four times (amount of methanol used: 5 mL per 1 g of the sample) to remove unreacted maleic anhydride therefrom, and then dried under reduced pressure at 80° C. for 12 h. The acid value of the sample was determined by the same method as described above. The reaction ratio of the modifying reagent was calculated according to the following formula.

[Reaction Ratio of Modifying Reagent]=[Acid Value after Washing]/[Acid Value before Washing]×100

TABLE 1

|  | Polymer | Weight-average molecular weight (×10³) | Molecular weight distribution Mw/Mn | Melt viscosity at 38° C. (Pa · s) |
|---|---|---|---|---|
| Production Example 1 | Maleic acid-modified polyfarnesene (C-1) | 140 | 1.2 | 90 |
| Production Example 2 | Maleic acid-modified polyfarnesene (C-2) | 135 | 1.2 | 107 |
| Production Example 3 | Maleic acid-modified polyfarnesene (C-3) | 166 | 1.3 | 291 |
| Production Example 4 | Maleic acid-modified polyfarnesene (C-4) | 39 | 1.1 | 9 |
| Comparative Production Example 1 | Polyisoprene (X-1) | 60 | 1.1 | 480 |
| Comparative Production Example 2 | Polyisoprene (X-2) | 32 | 1.1 | 74 |

Example 1 and Comparative Examples 1 and 2

The rubber component (A), silica (B), modified polymer (C), polyisoprene, TDAE, vulcanization aid and antioxidant were charged at respective compounding ratios (part(s) by mass) shown in Table 2 into a closed-type Banbury mixer and kneaded together for 6 min under such a condition that the initiating temperature was 75° C. and the resin temperature reached 160° C. The contents of the mixer were taken out of the mixer, and cooled to room temperature. Next, the resulting mixture was placed in a mixing roll, and after adding a vulcanizing agent and a vulcanization accelerator thereto, the obtained mixture was kneaded at 60° C. for 6 min, thereby obtaining about 1.2 kg of a rubber composition. The Mooney viscosity of the thus obtained rubber composition was measured by the below-mentioned method.

In addition, the resulting rubber composition was press-molded (at 145° C. for 45 min) to prepare a vulcanized rubber sheet (thickness: 2 mm). The thus prepared sheet was evaluated for a rolling resistance performance, a hardness and a tensile strength at break thereof by the following methods. The results are shown in Table 2.

Meanwhile, the methods of evaluating the respective properties are as follows.

Rolling Resistance Performance

A sheet prepared from the rubber composition produced in the respective Examples and Comparative Examples was cut into a test piece having a size of 40 mm in length×7 mm in width. The thus obtained test piece was subjected to measurement of tan δ as an index of a rolling resistance performance of the rubber composition using a dynamic viscoelasticity measuring apparatus available from GABO GmbH under the conditions including a measuring temperature of 60° C., a frequency of 10 Hz, a static distortion of 10% and a dynamic distortion of 2%. The values of the respective Examples and Comparative Examples are relative values based on 100 as the value of Comparative Example 2. Meanwhile, as the value is reduced, the rolling resistance performance of the rubber composition becomes more excellent.

Hardness (Steering Stability)

A sheet of the rubber composition produced in the respective Examples and Comparative Examples was subjected to measurement of hardness thereof using a type-A hardness tester according to JIS K 6253, and the thus measured hardness was used as an index of a flexibility of the rubber composition. Meanwhile, when the hardness value is less than 50, a tire produced from the rubber composition suffers from large deformation and therefore is deteriorated in steering stability.

Tensile Strength at Break (Mechanical Strength)

A sheet of the rubber composition produced in the respective Examples and Comparative Examples was punched into a dumbbell-shaped test piece according to JIS No. 3, and the obtained test piece was subjected to measurement of a tensile strength at break thereof using a tensile tester available from Instron Corp., according to JIS K 6251. The values of the respective Examples and Comparative Examples are relative values based on 100 as the value of Comparative Example 2. Meanwhile, the larger tensile strength value indicates that the rubber composition has more excellent fracture characteristics.

TABLE 2

|  | Example | Comparative Examples | |
|---|---|---|---|
|  | 1 | 1 | 2 |
| Compounding ratios (part(s) by mass) Component (A) | | | |
| Natural rubber | 100 | 100 | 100 |
| Component (B) | | | |
| Silica | 50 | 50 | 50 |
| Component (C) | | | |
| Maleic acid-modified polyfarnesene (C-1) | 5 | | |
| Optional Components | | | |
| Polyisoprene (X-1) | | 5 | |
| TDAE | | | 5 |
| Stearic acid | 2 | 2 | 2 |
| Silane coupling agent (1) | 4 | 4 | 4 |
| Zinc oxide | 3.5 | 3.5 | 3.5 |
| Antioxidant (1) | 1 | 1 | 1 |
| Antioxidant (2) | 1 | 1 | 1 |
| Sulfur | 1.5 | 1.5 | 1.5 |
| Vulcanization accelerator (1) | 1.2 | 1.2 | 1.2 |
| (B) × 100/(A) [part(s) by mass] | 50 | 50 | 50 |

TABLE 2-continued

|  | Example | Comparative Examples | |
|---|---|---|---|
|  | 1 | 1 | 2 |
| (C) × 100/(B) [part(s) by mass] | 10 | 0 | 0 |
| Evaluation | | | |
| Rolling resistance performance (at 60° C.; tanδ) (relative value) | 97 | 109 | 100 |
| Hardness (type A) | 58 | 58 | 55 |
| Tensile strength at break (relative value) | 110 | 101 | 100 |

The rubber composition obtained in Example 1 exhibited a good hardness and was excellent in rolling resistance performance and mechanical strength as compared to those rubber compositions of Comparative Examples 1 and 2 containing no modified polymer (C), and therefore could be suitably used as a rubber composition for tires.

Examples 2 to 4 and Comparative Examples 3 and 4

The rubber component (A), silica (B), modified polymer (C), polyisoprene, TDAE, wax, vulcanization aid and antioxidant were charged at respective compounding ratios (part(s) by mass) shown in Table 3 into a closed type Banbury mixer and kneaded together for 6 min under such a condition that the initiating temperature was 75° C. and the resin temperature reached 160° C. The resulting mixture was taken out of the mixer, and cooled to room temperature. Next, the mixture was placed in a mixing roll, and after adding a vulcanizing agent and a vulcanization accelerator thereto, the contents of the mixing roll were kneaded at 60° C. for 6 min, thereby obtaining about 1.3 kg of a rubber composition.

In addition, the resulting rubber composition was press-molded (at 145° C. for 30 min) to prepare a vulcanized rubber sheet (thickness: 2 mm). The thus prepared sheet was evaluated for a rolling resistance performance, a hardness and a tensile strength at break thereof by the above methods. Furthermore, the sheet was evaluated for an abrasion resistance and an elastic modulus thereof by the below-mentioned methods. The results are shown in Table 3.

Meanwhile, the values of the rolling resistance performance and the tensile strength at break as shown in Table 3 are relative values based on 100 as the respective values of Comparative Example 4.

Elastic Modulus

The vulcanized rubber sheet produced in the respective Examples and Comparative Examples was cut into a test piece having a size of 40 mm in length×7 mm in width. The thus obtained test piece was subjected to measurement of storage elastic modulus E' as an index of a stiffness of the rubber sheet using a dynamic viscoelasticity measuring apparatus available from GABO GmbH under the conditions including a measuring temperature of 25° C., a frequency of 10 Hz, a static distortion of 10% and a dynamic distortion of 2%. The values of the respective Examples and Comparative Examples are relative values based on 100 as the value of Comparative Example 4. Meanwhile, the larger value indicates that the tire produced from the rubber composition exhibits less deformation and more excellent steering stability.

TABLE 3

|  | Examples | | | Comparative Examples | |
|---|---|---|---|---|---|
|  | 2 | 3 | 4 | 3 | 4 |
| Compounding ratios (part(s) by mass) | | | | | |
| Component (A) | | | | | |
| Oil-extended styrene-butadiene rubber | 137.5 | 137.5 | 137.5 | 137.5 | 137.5 |
| Component (B) | | | | | |
| Silica | 72 | 72 | 72 | 72 | 72 |
| Component (C) | | | | | |
| Maleic acid-modified polyfarnesene (C-2) | 4 | | | | |
| Maleic acid-modified polyfarnesene (C-3) | | 4 | | | |
| Maleic acid-modified polyfarnesene (C-4) | | | 4 | | |
| Optional Components | | | | | |
| Polyisoprene (X-2) | | | | | 4 |
| TDAE | 3.5 | 3.5 | 3.5 | 3.5 | 7.5 |
| Stearic acid | 1 | 1 | 1 | 1 | 1 |
| Silane coupling agent (2) | 5.76 | 5.76 | 5.76 | 5.76 | 5.76 |
| Zinc oxide | 3.5 | 3.5 | 3.5 | 3.5 | 3.5 |
| Antioxidant (1) | 2 | 2 | 2 | 2 | 2 |
| Wax | 1 | 1 | 1 | 1 | 1 |
| Sulfur | 1.5 | 1.5 | 1.5 | 1.5 | 1.5 |
| Vulcanization accelerator (2) | 0.35 | 0.35 | 0.35 | 0.35 | 0.35 |
| Vulcanization accelerator (3) | 0.5 | 0.5 | 0.5 | 0.5 | 0.5 |
| Vulcanization accelerator (4) | 1.5 | 1.5 | 1.5 | 1.5 | 1.5 |
| (B) × 100/(A) [part(s) by mass] | 52.4 | 52.4 | 52.4 | 52.4 | 52.4 |
| (C) × 100/(B) [part(s) by mass] | 5.6 | 5.6 | 5.6 | 0.0 | 0.0 |
| Evaluation | | | | | |
| Rolling resistance performance (at 60° C.; tanδ) (relative value) | 97 | 94 | 99 | 105 | 100 |
| Hardness (type A) | 60 | 60 | 59 | 57 | 57 |
| Tensile strength at break (relative value) | 101 | 100 | 100 | 100 | 100 |
| Elastic modulus (relative value) | 110 | 111 | 103 | 101 | 100 |

The rubber compositions obtained in Examples 2 to 4 exhibited a high elastic modulus and were excellent in rolling resistance performance, hardness and mechanical strength as compared to those rubber compositions of Comparative Examples 3 and 4 containing no modified polymer (C), and therefore could be suitably used as a rubber composition for tires.

Production Example 5

Production of Maleic Anhydride-modified Farnesene-Butadiene Copolymer (C-5)

A pressure reaction vessel previously purged with nitrogen and then dried was charged with 1,121 g of hexane as a solvent and 49.2 g of sec-butyl lithium (in the form of a 10.5% by mass cyclohexane solution) as an initiator. The contents of the reaction vessel were heated to 50° C., and then 1,430 g of a mixture of β-farnesene (c1) and butadiene (c2) (which was previously prepared by mixing 1,260 g of β-farnesene (c1) and 840 g of butadiene (c2) in a bomb) was added thereto at a rate of 10 mL/min, and the contents of the reaction vessel were polymerized for 1 h. The resulting polymerization reaction solution was treated with methanol and then washed with water. After separating water from the thus washed polymerization reaction solution, the resulting solution was dried at 70° C. for 12 h, thereby obtaining an unmodified farnesene-butadiene copolymer.

Next, 500 g of the thus obtained unmodified farnesene-butadiene copolymer, 0.5 g of "NOCRAC 6C" as an antioxidant and 25 g of maleic anhydride were charged into a pressure reaction vessel. After purging the reaction vessel with nitrogen, the contents of the reaction vessel were heated to 170° C. and reacted at that temperature for 24 h, thereby obtaining a maleic anhydride-modified farnesene-butadiene copolymer (C-5) having properties shown in Table 4. Meanwhile, the reaction ratio of the modifying reagent was 96%, and the amount of the functional group added into the modified polymer (C-5) was 4.8 parts by mass on the basis of 100 parts by mass of the unmodified polymer.

Production Example 6

Production of Maleic Anhydride-modified Farnesene-Butadiene Copolymer (C-6)

A pressure reaction vessel previously purged with nitrogen and then dried was charged with 1,137 g of hexane as a solvent and 32.8 g of sec-butyl lithium (in the form of a 10.5% by mass cyclohexane solution) as an initiator. The contents of the reaction vessel were heated to 50° C., and then 1,430 g of a mixture of β-farnesene (c1) and butadiene (c2) (which was previously prepared by mixing 1,260 g of β-farnesene (c1) and 840 g of butadiene (c2) in a bomb) was added thereto at a rate of 10 mL/min, and the contents of the reaction vessel were polymerized for 1 h. The resulting polymerization reaction solution was treated with methanol and then washed with water. After separating water from the thus washed polymerization reaction solution, the resulting solution was dried at 70° C. for 12 h, thereby obtaining an unmodified farnesene-butadiene copolymer.

Next, 500 g of the thus obtained unmodified farnesene-butadiene copolymer, 0.5 g of "NOCRAC 6C" as an antioxidant and 25 g of maleic anhydride were charged into a pressure reaction vessel. After purging the reaction vessel with nitrogen, the contents of the reaction vessel were heated to 170° C. and reacted at that temperature for 24 h, thereby obtaining a maleic anhydride-modified farnesene-butadiene copolymer (C-6) having properties shown in Table 4. Meanwhile, the reaction ratio of the modifying reagent was 97%, and the amount of the functional group added into the modified polymer (C-6) was 4.9 parts by mass on the basis of 100 parts by mass of the unmodified polymer.

Production Example 7

Production of Maleic Anhydride-modified Farnesene-Butadiene Copolymer (C-7)

A pressure reaction vessel previously purged with nitrogen and then dried was charged with 1,152 g of hexane as a solvent and 18.5 g of sec-butyl lithium (in the form of a 10.5% by mass cyclohexane solution) as an initiator. The contents of the reaction vessel were heated to 50° C., and then 1,430 g of a mixture of β-farnesene (c1) and butadiene (c2) (which was previously prepared by mixing 1,170 g of β-farnesene (c1) and 780 g of butadiene (c2) in a bomb) was added thereto at a rate of 10 mL/min, and the contents of the reaction vessel were polymerized for 1 h. The resulting polymerization reaction solution was treated with methanol and then washed with water. After separating water from the thus washed polymerization reaction solution, the resulting solution was dried at 70° C. for 12 h, thereby obtaining an unmodified farnesene-butadiene copolymer.

Next, 500 g of the thus obtained unmodified farnesene-butadiene copolymer, 0.5 g of "NOCRAC 6C" as an antioxidant and 25 g of maleic anhydride were charged into a pressure reaction vessel. After purging the reaction vessel with nitrogen, the contents of the reaction vessel were heated to 170° C. and reacted at that temperature for 24 h, thereby obtaining a maleic anhydride-modified farnesene-butadiene copolymer (C-7) having properties shown in Table 4. Meanwhile, the reaction ratio of the modifying reagent was 94%, and the amount of the functional group added into the modified polymer (C-7) was 4.7 parts by mass on the basis of 100 parts by mass of the unmodified polymer.

Production Example 8

Production of Maleic Anhydride-modified Farnesene-Butadiene Copolymer (C-8)

A pressure reaction vessel previously purged with nitrogen and then dried was charged with 1,147 g of hexane as a solvent and 22.3 g of sec-butyl lithium (in the form of a 10.5% by mass cyclohexane solution) as an initiator. The contents of the reaction vessel were heated to 50° C., and then 1,430 g of a mixture of β-farnesene (c1) and butadiene (c2) (which was previously prepared by mixing 1,520 g of β-farnesene (c1) and 380 g of butadiene (c2) in a bomb) was added thereto at a rate of 10 mL/min, and the contents of the reaction vessel were polymerized for 1 h. The resulting polymerization reaction solution was treated with methanol and then washed with water. After separating water from the thus washed polymerization reaction solution, the resulting solution was dried at 70° C. for 12 h, thereby obtaining an unmodified farnesene-butadiene copolymer.

Next, 500 g of the thus obtained unmodified farnesene-butadiene copolymer, 0.5 g of "NOCRAC 6C" as an antioxidant and 25 g of maleic anhydride were charged into a pressure reaction vessel. After purging the reaction vessel with nitrogen, the contents of the reaction vessel were heated to 170° C. and reacted at that temperature for 24 h, thereby obtaining a maleic anhydride-modified farnesene-butadiene copolymer (C-8) having properties shown in Table 4. Meanwhile, the reaction ratio of the modifying reagent was 96%, and the amount of the functional group added into the modified polymer (C-8) was 4.8 parts by mass on the basis of 100 parts by mass of the unmodified polymer.

Production Example 9

Production of Maleic Anhydride-modified Farnesene-Butadiene Copolymer (C-9)

A pressure reaction vessel previously purged with nitrogen and then dried was charged with 1,136 g of hexane as a solvent and 32.2 g of sec-butyl lithium (in the form of a 10.5% by mass cyclohexane solution) as an initiator. The contents of the reaction vessel were heated to 50° C., and then 1,430 g of a mixture of β-farnesene (c1) and butadiene (c2) (which was previously prepared by mixing 1,000 g of β-farnesene (c1) and 1,000 g of butadiene (c2) in a bomb) was added thereto at a rate of 10 mL/min, and the contents of the reaction vessel were polymerized for 1 h. The resulting polymerization reaction solution was treated with methanol and then washed with water. After separating water from the thus washed polymerization reaction solution, the resulting solution was dried at 70° C. for 12 h, thereby obtaining an unmodified farnesene-butadiene copolymer.

Next, 500 g of the thus obtained unmodified farnesene-butadiene copolymer, 0.5 g of "NOCRAC 6C" as an antioxidant and 25 g of maleic anhydride were charged into a pressure reaction vessel. After purging the reaction vessel with nitrogen, the contents of the reaction vessel were heated to 170° C. and reacted at that temperature for 24 h, thereby obtaining a maleic anhydride-modified farnesene-butadiene copolymer (C-9) having properties shown in Table 4. Meanwhile, the reaction ratio of the modifying reagent was 94%, and the amount of the functional group added into the modified polymer (C-9) was 4.7 parts by mass on the basis of 100 parts by mass of the unmodified polymer.

Production Example 10

Production of Maleic Anhydride-modified Farnesene-Butadiene Copolymer (C-10)

A pressure reaction vessel previously purged with nitrogen and then dried was charged with 1,133 g of hexane as a solvent and 36.9 g of sec-butyl lithium (in the form of a 10.5% by mass cyclohexane solution) as an initiator. The contents of the reaction vessel were heated to 50° C., and then 1,430 g of a mixture of β-farnesene (c1) and butadiene (c2) (which was previously prepared by mixing 390 g of β-farnesene (c1) and 1,560 g of butadiene (c2) in a bomb) was added thereto at a rate of 10 mL/min, and the contents of the reaction vessel were polymerized for 1 h. The resulting polymerization reaction solution was treated with methanol and then washed with water. After separating water from the thus washed polymerization reaction solution, the resulting solution was dried at 70° C. for 12 h, thereby obtaining an unmodified farnesene-butadiene copolymer.

Next, 500 g of the thus obtained unmodified farnesene-butadiene copolymer, 0.5 g of "NOCRAC 6C" as an antioxidant and 25 g of maleic anhydride were charged into a pressure reaction vessel. After purging the reaction vessel with nitrogen, the contents of the reaction vessel were heated to 170° C. and reacted at that temperature for 24 h, thereby obtaining a maleic anhydride-modified farnesene-butadiene copolymer (C-10) having properties shown in Table 4. Meanwhile, the reaction ratio of the modifying reagent was 92%, and the amount of the functional group added into the modified polymer (C-10) was 4.6 parts by mass on the basis of 100 parts by mass of the unmodified polymer.

Production Example 11

A mixture prepared by adding 5.9 g of methanol to 315 g of the maleic anhydride-modified farnesene-butadiene copolymer (C-5) produced in Production Example 5 was reacted at 80° C. for 6 h, thereby obtaining a maleic acid monomethyl ester-modified farnesene-butadiene copolymer (C-11).

Production Example 12

A mixture prepared by adding 5.9 g of methanol to 315 g of the maleic anhydride-modified farnesene-butadiene copolymer (C-6) produced in Production Example 6 was reacted at 80° C. for 6 h, thereby obtaining a maleic acid monomethyl ester-modified farnesene-butadiene copolymer (C-12).

Production Example 13

A mixture prepared by adding 5.9 g of methanol to 315 g of the maleic anhydride-modified farnesene-butadiene copolymer (C-7) produced in Production Example 7 was reacted at 80° C. for 6 h, thereby obtaining a maleic acid monomethyl ester-modified farnesene-butadiene copolymer (C-13).

Production Example 14

A mixture prepared by adding 5.9 g of methanol to 315 g of the maleic anhydride-modified farnesene-butadiene copolymer (C-8) produced in Production Example 8 was reacted at 80° C. for 6 h, thereby obtaining a maleic acid monomethyl ester-modified farnesene-butadiene copolymer (C-14).

Production Example 15

A mixture prepared by adding 5.9 g of methanol to 315 g of the maleic anhydride-modified farnesene-butadiene copolymer (C-9) produced in Production Example 9 was reacted at 80° C. for 6 h, thereby obtaining a maleic acid monomethyl ester-modified farnesene-butadiene copolymer (C-15).

Production Example 16

A mixture prepared by adding 5.9 g of methanol to 315 g of the maleic anhydride-modified farnesene-butadiene copolymer (C-9) produced in Production Example 10 was reacted at 80° C. for 6 h, thereby obtaining a maleic acid monomethyl ester-modified farnesene-butadiene copolymer (C-10).

Production Example 17

A mixture prepared by adding 5.9 g of methanol to 315 g of the maleic anhydride-modified polyfarnesene (C-4) produced in Production Example 4 was reacted at 80° C. for 6 h, thereby obtaining a maleic acid monomethyl ester-modified polyfarnesene (C-17).

Comparative Production Example 3

Production of Polyfarnesene (X-3)

A pressure reaction vessel previously purged with nitrogen and then dried was charged with 1,392 g of cyclohexane and 8.0 g of sec-butyl lithium (in the form of a 10.5% by mass cyclohexane solution). The contents of the reaction vessel were heated to 50° C., and 1,400 g of farnesene was added thereto and polymerized for 1 h. The resulting polymerization reaction solution was mixed with methanol and then washed with water. After separating water from the thus washed polymerization reaction solution, the resulting solution was dried at 70° C. for 12 h, thereby obtaining a polyfarnesene (X-3) having properties shown in Table 4.

Meanwhile, the weight-average molecular weight (Mw), molecular weight distribution (Mw/Mn) and melt viscosity of each of the modified polymers (C) obtained in Production Examples 5 to 17 and the polyfarnesene obtained in Comparative Production Example 3 were measured by the same methods as described above. In addition, the methods of measuring a glass transition temperature, an equivalent amount of a functional group, an amount of a functional group added, and an average number of functional groups per one molecule of the polymer are as follows.

(Glass Transition Temperature)

Ten milligrams of the modified farnesene polymer were sampled in an aluminum pan, and a thermogram of the sample was measured at temperature rise rate of 10° C./min by differential scanning calorimetry (DSC), and the value at a peak top observed in the DDSC curve was determined as a glass transition temperature of the polymer.

(Equivalent Amount of Functional Group)

A sample obtained after the modification reaction was washed with methanol four times (amount of methanol used: 5 mL per 1 g of the sample) to remove impurities therefrom, and then dried under reduced pressure at 80° C. for 12 h. After adding 180 mL of toluene and 20 mL of ethanol to 3 g of the thus treated sample to dissolve the sample therein, the resulting solution was subjected to neutralization titration with a 0.1N potassium hydroxide ethanol solution to determine an acid value of the sample.

Acid Value (mgKOH/g)=$(A-B) \times F \times 5.611/S$ wherein A is a dropping amount (mL) of the 0.1N potassium hydroxide ethanol solution required for neutralizing the sample solution; B is a dropping amount (mL) of the 0.1N potassium hydroxide ethanol solution required for neutralizing a blank containing no sample; F is a titer of the 0.1N potassium hydroxide ethanol solution; and S is a mass (g) of the sample weighed.

Next, the mass of the functional group contained per 1 g of the modified polymer (C) and the mass of the moiety other than the functional group contained per 1 g of the modified polymer (C) (mass of a main chain of the polymer) were respectively calculated from the thus measured acid value. The equivalent amount (g/eq) of the functional group was calculated according to the following formula.

[Mass of Functional Group per 1 g of Polymer]= [Acid Value]/[56.11]×[Molecular Weight of Functional Group]/1000

[Mass of Main Chain of Polymer per 1 g of Polymer]=1−[Mass of Functional Group per 1 g of Polymer]

[Equivalent Amount of Functional Group]=[Mass of Main Chain of Polymer per 1 g of Polymer]/ ([Mass of Functional Group per 1 g of Polymer]/[Molecular Weight of Functional Group]

(Amount of Functional Group Added)

The amount [part(s) by mass] of the functional group added to 100 parts by mass of the unmodified polymer (amount of the modifying reagent) was calculated according to the following formula.

[Amount of Functional Group Added]=([Mass of Functional Group per 1 g of Polymer]/[Mass of Main Chain of Polymer per 1 g of Polymer]× 100

(Average Number of Functional Groups Per One Molecule of Polymer)

Production Examples 4 to 9 or Production Example 10

One hundred eighty milliliters of toluene and 20 mL of ethanol were added to 3 g of a sample obtained after the modification reaction in each of Production Examples 4 to 9 or Production Example 10, and the resulting solution was reacted at room temperature for 30 min. Thereafter, the reaction solution was vacuum dried at 60° C. for 12 h. The resulting sample was subjected to $^1$H-NMR (500 MHz) measurement using an NMR analyzer available from JEOL Ltd., under such a condition that the sample concentration (sample/heavy chloroform) was 100 mg/1 mL; the cumulative number was 512 times; and the measuring temperature was 30° C. The average number of functional groups per one molecule of the modified polymer (C) was calculated from an area ratio between a peak derived from a methylene group of the ethyl ester and a peak derived from a terminal end of the initiator for the polymer in the obtained NMR spectrum.

Production Examples 11 to 16 or Production Example 17

A sample obtained after the modification reaction in each of Production Examples 11 to 16 or Production Example 17 was subjected to $^1$H-NMR (500 MHz) measurement using an NMR analyzer available from JEOL Ltd., under such a condition that the sample concentration (sample/heavy chloroform) was 100 mg/1 mL; the cumulative number was 512 times; and the measuring temperature was 30° C. The average number of functional groups per one molecule of the modified polymer (C) was calculated from an area ratio between a peak derived from a methyl group of the methyl ester and a peak derived from a terminal end of the initiator for the polymer in the obtained NMR spectrum.

TABLE 4

| Production Examples | Polymer | (C2)/{(C1) + (C2)} (% by mass) | Monomer unit (C2) | Weight-average molecular weight (×10³) | Molecular weight distribution Mw/Mn |
|---|---|---|---|---|---|
| Production Example 5 | Modified copolymer (C-5) | 40 | Butadiene | 38 | 1.19 |
| Production Example 6 | Modified copolymer (C-6) | 40 | Butadiene | 60 | 1.14 |
| Production Example 7 | Modified copolymer (C-7) | 40 | Butadiene | 103 | 1.27 |
| Production Example 8 | Modified copolymer (C-8) | 20 | Butadiene | 57 | 1.12 |
| Production Example 9 | Modified copolymer (C-9) | 50 | Butadiene | 55 | 1.12 |
| Production Example 10 | Modified copolymer (C-10) | 80 | Butadiene | 55 | 1.15 |
| Production Example 11 | Modified copolymer (C-11) | 40 | Butadiene | 34 | 1.08 |

TABLE 4-continued

| | | | | | |
|---|---|---|---|---|---|
| Production Example 12 | Modified copolymer (C-12) | 40 | Butadiene | 62 | 1.15 |
| Production Example 13 | Modified copolymer (C-13) | 40 | Butadiene | 98 | 1.19 |
| Production Example 14 | Modified copolymer (C-14) | 20 | Butadiene | 58 | 1.13 |
| Production Example 15 | Modified copolymer (C-15) | 50 | Butadiene | 55 | 1.13 |
| Production Example 16 | Modified copolymer (C-16) | 80 | Butadiene | 55 | 1.16 |
| Production Example 4 | Modified polyfarnesene (C-4) | 0 | — | 39 | 1.06 |
| Production Example 17 | Modified polyfarnesene (C-17) | 0 | — | 39 | 1.06 |
| Comparative Production Example 3 | Polyfarnesene (X-3) | 0 | — | 37 | 1.05 |

| Production Examples | Melt viscosity at 38° C. (Pa·s) | Glass transition temperature (° C.) | Equivalent amount of functional group (g/eq) | Amount of functional group added (part(s) by mass) | Average number of functional groups per one molecule of polymer |
|---|---|---|---|---|---|
| Production Example 5 | 37 | −72 | 2064 | 4.8 | 8 |
| Production Example 6 | 176 | −72 | 1989 | 4.9 | 13 |
| Production Example 7 | 1060 | −73 | 2105 | 4.7 | 23 |
| Production Example 8 | 69 | −69 | 2034 | 4.8 | 19 |
| Production Example 9 | 248 | −76 | 2072 | 4.7 | 13 |
| Production Example 10 | 846 | −84 | 2114 | 4.6 | 12 |
| Production Example 11 | 67 | −72 | 2032 | 6.4 | 8 |
| Production Example 12 | 331 | −72 | 1958 | 6.6 | 13 |
| Production Example 13 | 1682 | −72 | 2074 | 6.3 | 23 |
| Production Example 14 | 128 | −69 | 2002 | 6.5 | 19 |
| Production Example 15 | 441 | −74 | 2040 | 6.4 | 13 |
| Production Example 16 | 1360 | −83 | 2082 | 6.2 | 12 |
| Production Example 4 | 20 | −65 | 2208 | 4.4 | 13 |
| Production Example 17 | 38 | −66 | 2176 | 6.0 | 13 |
| Comparative Production Example 3 | 7 | −72 | — | — | 0 |

Examples 5 to 18 and Comparative Examples 5 and 6

The rubber component (A), silica (B), modified polymer (C), polyfarnesene, polyisoprene, TDAE, wax, vulcanization aid and antioxidant were charged at respective compounding ratios (part(s) by mass) shown in Tables 5-1 and 5-2 into a closed type Banbury mixer and kneaded together for 6 min under such a condition that the initiating temperature was 75° C. and the resin temperature reached 160° C. The resulting mixture was taken out of the mixer, and cooled to room temperature. Next, the mixture was placed in a mixing roll, and after adding a vulcanizing agent and a vulcanization accelerator thereto, the contents of the mixing roll were kneaded at 60° C. for 6 min, thereby obtaining about 1.3 kg of a rubber composition. The rubber compositions obtained in Examples 5 to 16 were evaluated for Mooney viscosity thereof by the following method.

In addition, each of the resulting rubber compositions was press-molded (at 145° C. for 30 min) to prepare a vulcanized rubber sheet (thickness: 2 mm). The thus prepared sheet was evaluated for a rolling resistance performance, a hardness, a tensile strength at break and an elastic modulus thereof by the above methods. Furthermore, the sheet was evaluated for an abrasion resistance thereof by the following method. The results are shown in Tables 5-1 and 5-2.

Meanwhile, the values of the rolling resistance performance, the tensile strength at break and the elastic modulus shown in Tables 5-1 and 5-2 are relative values based on 100 as the respective values of Comparative Example 6 shown in Table 5-2.

Abrasion Resistance

The rubber composition was measured for DIN abrasion loss under a load of 10 N at an abrasion distance of 40 m according to JIS K 6264. The inverse number of the DIN abrasion loss (1/DIN abrasion loss) was used as an index of an abrasion resistance of the rubber composition. The values of the respective Examples and Comparative Examples shown in Tables 5-1 and 5-2 are relative values based on 100 as the value of Comparative Example 6. Meanwhile, the larger value indicates less abrasion loss of the rubber composition and therefore more excellent abrasion resistance thereof.

Mooney Viscosity

As an index of a processability of a rubber composition, the Mooney viscosity (ML1+4) of the respective rubber compositions before being vulcanized which were obtained in the above Examples 5 to 16 was measured at 100° C. according to JIS K 6300. The values of the respective Examples shown in Tables 5-1 and 5-2 are relative values based on 100 as the value of Example 5. Meanwhile, the smaller Mooney viscosity value indicates a more excellent processability.

TABLE 5-1

| Compounding ratios | Examples | | | | | | | | |
|---|---|---|---|---|---|---|---|---|---|
| (part(s) by mass) | 5 | 6 | 7 | 8 | 9 | 10 | 11 | 12 | 13 |
| Component (A) | | | | | | | | | |
| Oil-extended styrene-butadiene rubber | 137.5 | 137.5 | 137.5 | 137.5 | 137.5 | 137.5 | 137.5 | 137.5 | 137.5 |

TABLE 5-1-continued

| Compounding ratios | Examples | | | | | | | | |
|---|---|---|---|---|---|---|---|---|---|
| (part(s) by mass) | 5 | 6 | 7 | 8 | 9 | 10 | 11 | 12 | 13 |
| Component (B) | | | | | | | | | |
| Silica | 72 | 72 | 72 | 72 | 72 | 72 | 72 | 72 | 72 |
| Component (C) | | | | | | | | | |
| Modified copolymer (C-5) | 4 | | | | | | | | |
| Modified copolymer (C-6) | | 4 | | | | | | | |
| Modified copolymer (C-7) | | | 4 | | | | | | |
| Modified copolymer (C-8) | | | | 4 | | | | | |
| Modified copolymer (C-9) | | | | | 4 | | | | |
| Modified copolymer (C-10) | | | | | | 4 | | | |
| Modified copolymer (C-11) | | | | | | | 4 | | |
| Modified copolymer (C-12) | | | | | | | | 4 | |
| Modified copolymor (C-13) | | | | | | | | | 4 |
| Optional Components | | | | | | | | | |
| TDAE | 3.5 | 3.5 | 3.5 | 3.5 | 3.5 | 3.5 | 3.5 | 3.5 | 3.5 |
| Stearic acid | 1 | 1 | 1 | 1 | 1 | 1 | 1 | 1 | 1 |
| Silane coupling agent (2) | 5.76 | 5.76 | 5.76 | 5.76 | 5.76 | 5.76 | 5.76 | 5.76 | 5.76 |
| Zinc oxide | 3.5 | 3.5 | 3.5 | 3.5 | 3.5 | 3.5 | 3.5 | 3.5 | 3.5 |
| Antioxidant (1) | 2 | 2 | 2 | 2 | 2 | 2 | 2 | 2 | 2 |
| Wax | 1 | 1 | 1 | 1 | 1 | 1 | 1 | 1 | 1 |
| Sulfur | 1.5 | 1.5 | 1.5 | 1.5 | 1.5 | 1.5 | 1.5 | 1.5 | 1.5 |
| Vulcanization accelerator (2) | 0.35 | 0.35 | 0.35 | 0.35 | 0.35 | 0.35 | 0.35 | 0.35 | 0.35 |
| Vulcanization accelerator (3) | 0.5 | 0.5 | 0.5 | 0.5 | 0.5 | 0.5 | 0.5 | 0.5 | 0.5 |
| Vulcanization accelerator (4) | 1.5 | 1.5 | 1.5 | 1.5 | 1.5 | 1.5 | 1.5 | 1.5 | 1.5 |
| (B) × 100/(A) [part(s) by mass] | 52.4 | 52.4 | 52.4 | 52.4 | 52.4 | 52.4 | 52.4 | 52.4 | 52.4 |
| (C) × 100/(B) [part(s) by mass] | 5.6 | 5.6 | 5.6 | 5.6 | 5.6 | 5.6 | 5.6 | 5.6 | 5.6 |
| Evaluation | | | | | | | | | |
| Rolling resistance performance (at 60° C.; tanδ) (relative value) | 85 | 85 | 86 | 85 | 84 | 85 | 85 | 85 | 84 |
| Hardness (type A) | 63 | 63 | 62 | 63 | 62 | 62 | 64 | 64 | 65 |
| Tensile strength at break (relative value) | 101 | 100 | 106 | 100 | 100 | 101 | 100 | 100 | 104 |
| Elastic modulus (relative value) | 107 | 107 | 108 | 106 | 106 | 108 | 113 | 115 | 120 |
| Abrasion resistance (relative value) | 104 | 106 | 108 | 101 | 109 | 111 | 104 | 103 | 104 |
| Mooney viscosity of rubber composition (relative value) | 100 | 100 | 102 | 98 | 100 | 104 | 93 | 95 | 96 |

TABLE 5-2

| Compounding ratios | Examples | | | | | Comparative Examples | |
|---|---|---|---|---|---|---|---|
| (part(s) by mass) | 14 | 15 | 16 | 17 | 18 | 5 | 6 |
| Component (A) | | | | | | | |
| Oil-extended styrene-butadiene rubber | 137.5 | 137.5 | 137.5 | 137.5 | 137.5 | 137.5 | 137.5 |
| Component (B) | | | | | | | |
| Silica | 72 | 72 | 72 | 72 | 72 | 72 | 72 |
| Component (C) | | | | | | | |
| Modified copolymer (C-14) | 4 | | | | | | |
| Modified copolymer (C-15) | | 4 | | | | | |
| Modified copolymer (C-16) | | | 4 | | | | |
| Modified polyfarnesene (C-4) | | | | 4 | | | |
| Modified polyfarnesene (C-17) | | | | | 4 | | |
| Optional Components | | | | | | | |
| Polyfarnesene (X-3) | | | | | | 4 | |
| Polyisoprene (X-2) | | | | | | | 4 |
| TDAE | 3.5 | 3.5 | 3.5 | 3.5 | 3.5 | 3.5 | 3.5 |
| Stearic acid | 1 | 1 | 1 | 1 | 1 | 1 | 1 |
| Silane coupling agent (2) | 5.76 | 5.76 | 5.76 | 5.76 | 5.76 | 5.76 | 5.76 |
| Zinc oxide | 3.5 | 3.5 | 3.5 | 3.5 | 3.5 | 3.5 | 3.5 |
| Antioxidant (1) | 2 | 2 | 2 | 2 | 2 | 2 | 2 |
| Wax | 1 | 1 | 1 | 1 | 1 | 1 | 1 |
| Sulfur | 1.5 | 1.5 | 1.5 | 1.5 | 1.5 | 1.5 | 1.5 |

TABLE 5-2-continued

| Compounding ratios | Examples | | | | | Comparative Examples | |
|---|---|---|---|---|---|---|---|
| (part(s) by mass) | 14 | 15 | 16 | 17 | 18 | 5 | 6 |
| Vulcanization accelerator (2) | 0.35 | 0.35 | 0.35 | 0.35 | 0.35 | 0.35 | 0.35 |
| Vulcanization accelerator (3) | 0.5 | 0.5 | 0.5 | 0.5 | 0.5 | 0.5 | 0.5 |
| Vulcanization accelerator (4) | 1.5 | 1.5 | 1.5 | 1.5 | 1.5 | 1.5 | 1.5 |
| (B) × 100/(A) [part(s) by mass] | 52.4 | 52.4 | 52.4 | 52.4 | 52.4 | 52.4 | 52.4 |
| (C) × 100/(B) [part(s) by mass] | 5.6 | 5.6 | 5.6 | 5.6 | 5.6 | 0.0 | 0.0 |
| Evaluation | | | | | | | |
| Rolling resistance performance (at 60° C.; tanδ) (relative value) | 85 | 84 | 86 | 94 | 89 | 98 | 100 |
| Hardness (type A) | 65 | 63 | 63 | 59 | 62 | 59 | 57 |
| Tensile strength at break (relative value) | 100 | 101 | 100 | 100 | 99 | 99 | 100 |
| Elastic modulus (relative value) | 115 | 116 | 115 | 102 | 112 | 100 | 100 |
| Abrasion resistance (relative value) | 100 | 105 | 111 | 100 | 102 | 98 | 100 |
| Mooney viscosity of rubber composition (relative value) | 95 | 95 | 97 | — | — | — | — |

The rubber compositions obtained in Examples 5 to 18 had high elastic modulus and good steering stability and also were excellent in rolling resistance performance and hardness as well as mechanical strength when processed into a vulcanized rubber, as compared to those rubber compositions of Comparative Examples 5 and 6 containing no modified polymer (C). Therefore, the rubber compositions obtained in Examples 5 to 18 could be suitably used as a rubber composition for tires. Among them, the rubber compositions obtained in Examples 5 to 16 containing butadiene as the monomer unit (c2) other than farnesene were more excellent in rolling resistance performance, elastic modulus and abrasion resistance when processed into a vulcanized rubber. In addition, the rubber compositions obtained in Examples 11 to 16 and Example 18 containing the modified polymer further modified with methanol after being modified with the malic anhydride were even more excellent in elastic modulus when processed into a vulcanized rubber.

Furthermore, when comparing Examples 8 to 10 with Examples 14 to 16 in which the content of the monomer unit (c2) other than farnesene in the modified polymer (C) were changed variously, it was confirmed that when the content of the monomer unit (c2) in the modified polymer (C) fell within the range of from 20 to 60% by mass, the rubber compositions had a lower Mooney viscosity and therefore exhibited good processability.

The invention claimed is:

1. A rubber composition comprising (A) a rubber component comprising at least one rubber selected from the group consisting of a styrene-butadiene rubber, a butadiene rubber, an isoprene rubber, a butyl rubber, a halogenated butyl rubber, an ethylene propylene diene rubber, a butadiene acrylonitrile copolymer rubber, a chloroprene rubber and a natural rubber, (B) silica and (C) a modified polymer consisting of farnesene units, optionally other monomer units, and a functional group on the modified polymer,
  wherein the functional group is selected from the group consisting of an amino group, an ammonium group, an amide group, an imino group, an imidazole group, a urea group, an alkoxysilyl group, a silanol group, a hydroxy group, an epoxy group, an ether group, a carboxy group, a carbonyl group, carboxylate group, a sulfonic group, a sulfonate group, a phosphoric group, a phosphate group, a mercapto group, an isocyanate group, a nitrile group, a silicon halide group, a tin halide group and a functional group derived from an acid anhydride,
  in which a content of the silica (B) in the rubber composition is from 20 to 150 parts by mass on the basis of 100 parts by mass of the rubber component (A), and a content of the modified polymer (C) in the rubber composition is from 2 to 10 parts by mass on the basis of 100 parts by mass of the silica (B), and
  wherein the other monomer units are one or more of a conjugated diene having not more than 12 carbon atoms selected from the group consisting of butadiene, isoprene, 2,3-dimethyl-butadiene, 2-phenyl-butadiene, 1,3-pentadiene, 2-methyl-1,3-pentadiene, 1,3-hexadiene, 1,3-octadiene, 1,3-cyclohexadiene, 2-methyl-1,3-octadiene, 1,3,7-octatriene, myrcene and chloroprene.

2. The rubber composition according to claim 1, wherein the functional group of the modified polymer (C) is at least one group selected from the group consisting of a carboxy group, an amino group, a hydroxy group and a functional group derived from an acid anhydride.

3. The rubber composition according to claim 1, wherein the silica (B) has an average particle size of from 0.5 to 200 nm.

4. The rubber composition according to claim 1, wherein the modified polymer (C) has a melt viscosity of from 0.1 to 3,000 Pa·s as measured at 38° C.

5. The rubber composition according to claim 1, wherein the modified polymer (C) has a weight-average molecular weight (Mw) of from 2,000 to 500,000.

6. The rubber composition according to claim 1, wherein the modified polymer (C) is a copolymer constituted of (c1) a monomer unit derived from β-farnesene and (c2) a monomer unit derived from a monomer other than β-farnesene.

7. The rubber composition according to claim 1, further comprising a silane coupling agent in an amount of from 0.1 to 30 parts by mass on the basis of 100 parts by mass of the silica (B).

8. The rubber composition according to claim 1, wherein the rubber component (A) comprises at least one rubber selected from the group consisting of a styrene-butadiene rubber, a butadiene rubber, an isoprene rubber and a natural rubber.

9. The rubber composition according to claim 1, wherein the other monomer units are selected from the group consisting of butadiene, isoprene, and myrcene.

10. The rubber composition according to claim 1, wherein the functional group is a functional group derived from an acid anhydride.

11. The rubber composition according to claim 10, wherein the functional group derived from an acid anhydride is selected from the group consisting of a carboxylic acid anhydride group, a dicarboxylic acid group obtained by ring-opening reaction of carboxylic anhydride, a dicarboxylic acid monoester group obtained by ring-opening reaction of carboxylic anhydride and a dicarboxylic acid monoamide group obtained by ring-opening reaction of carboxylic anhydride.

12. The rubber composition according to claim 1, wherein the rubber component (A) comprises at least one rubber selected from the group consisting of a styrene-butadiene rubber and a natural rubber.

13. The rubber composition according to claim 12, wherein the rubber component (A) comprises the styrene-butadiene rubber, which has a weight-average molecular weight of from 100,000 to 2,500,000.

14. The rubber composition according to claim 12, wherein the rubber component (A) comprises the styrene-butadiene rubber, which has a styrene content of from 0.1 to 70% by mass.

15. A tire comprising the rubber composition according to claim 1 in at least a part thereof.

* * * * *